US012615384B2

(12) United States Patent
Zhao et al.

(10) Patent No.: US 12,615,384 B2
(45) Date of Patent: Apr. 28, 2026

(54) EXPLICIT SIGNALING FOR BLOCK BASED ADAPTIVE WEIGHTING FACTORS

(71) Applicant: Tencent America LLC, Palo Alto, CA (US)

(72) Inventors: Liang Zhao, Sunnyvale, CA (US); Han Gao, San Diego, CA (US); Xin Zhao, San Jose, CA (US); Jing Ye, San Jose, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 162 days.

(21) Appl. No.: 18/461,785

(22) Filed: Sep. 6, 2023

(65) Prior Publication Data

US 2024/0348810 A1      Oct. 17, 2024

Related U.S. Application Data

(60) Provisional application No. 63/459,565, filed on Apr. 14, 2023.

(51) Int. Cl.
| | |
|---|---|
| *H04N 19/44* | (2014.01) |
| *H04N 19/105* | (2014.01) |
| *H04N 19/176* | (2014.01) |
| *H04N 19/70* | (2014.01) |

(52) U.S. Cl.
CPC ........... *H04N 19/44* (2014.11); *H04N 19/105* (2014.11); *H04N 19/176* (2014.11); *H04N 19/70* (2014.11)

(58) Field of Classification Search
CPC .............................. H04N 19/44; H04N 19/105
See application file for complete search history.

(56) References Cited

U.S. PATENT DOCUMENTS

| | | | |
|---|---|---|---|
| 11,553,174 B2 * | 1/2023 | Filippov | .............. H04N 19/503 |
| 12,244,854 B2 * | 3/2025 | Xu | ......................... H04N 19/523 |
| 2015/0222913 A1 * | 8/2015 | Sato | ....................... H04N 19/80 |
| | | | 375/240.25 |

(Continued)

OTHER PUBLICATIONS

International Search Report and Written Opinion for International Patent Application No. PCT/US23/73916 dated Dec. 12, 2023, 9 pages.

(Continued)

*Primary Examiner* — Irfan Habib
(74) *Attorney, Agent, or Firm* — Crowell & Moring LLP

(57) ABSTRACT

This disclosure relates generally to video coding/decoding and particularly for enhancing block adaptive weighted prediction. One method includes receiving a video bitstream comprising a current block and a reference block, the reference block being used for predicting the current block and being identified by a motion vector associated with the current block; receiving, from the video bitstream, a syntax element indicating a scale factor ($\alpha$); determining the scale factor ($\alpha$) based on a value of the syntax element; predicting the current block using an equation $p'(x')=\alpha^*p(x)+\beta$, where: $p'(x')$ is a predicted sample in the current block, $p(x)$ is a collocated reference sample in the reference block corresponding to $p'(x')$, $\alpha$ is the determined scale factor based on the value of the syntax element, and $\beta$ is an offset; and reconstructing the current block based on the predicted current block.

20 Claims, 12 Drawing Sheets

(56)                  References Cited

U.S. PATENT DOCUMENTS

| | | | | |
|---|---|---|---|---|
| 2015/0350671 A1* | 12/2015 | Alshin | .................. | H04N 19/13 |
| | | | | 375/240.15 |
| 2019/0141339 A1* | 5/2019 | Madajczak | .......... | G06T 15/005 |
| 2020/0228796 A1* | 7/2020 | Seregin | ................ | H04N 19/132 |
| 2021/0211716 A1* | 7/2021 | Zhang | ................. | H04N 19/513 |
| 2021/0227209 A1* | 7/2021 | Liu | ..................... | H04N 19/583 |
| 2022/0103816 A1* | 3/2022 | Karczewicz | .......... | H04N 19/70 |
| 2022/0286666 A1* | 9/2022 | Zhu | ..................... | H04N 19/176 |
| 2024/0357130 A1* | 10/2024 | Park | ...................... | H04N 19/30 |

OTHER PUBLICATIONS

Bross et al., "Versatile Video Coding Editorial Refinements on Draft 10," JVET of ITU-T SG 16 WP 3 and ISO/IEC JTC 1/SC 29, 20th Meeting, Document: JVET-T2001-v2, Oct. 7, 2020, 511 pages.

Chen et al., "An Overview of Core Coding Tools in the AV1 Video Codec," 2018 Picture Coding Symposium (PCS), San Francisco, CA, USA, Jun. 2018, pp. 41-45.

Coban et al., "Algorithm description of Enhanced Compression Model 2 (ECM 2)," JVET of ITU-T SG 16 WP 3 and ISO/IEC JTC 1/SC 29, 20th Meeting, Document: JVET-W2025, July 7, 2021, 22 pages.

Bross, Benjamin et al., "Versatile Video Coding Editorial Refinements on Draft 10", Joint Video Experts Team (JVET) of ITU-T SG 16 WO 3 and ISO/IEC JTC 1/SC29, 20th Meeting, Oct. 7-16, 2020.

Chen, Yue et al., "An Overview of Core Coding Tools in the AV1 Video Codec", Alliance for Open Media (AOMedia) industry consortium, 2018.

De Rivaz, Peter et al., "AV1 Bitstream & Decoding Process Specification", Version 1.0 . . . 0 with Errata 1, AOMediaCodec/av1-spec project, modified Jan. 8, 2019.

Karpilovsky, Elliott et al., "Proposal: New Inter Modes for AV2", Alliance for Open Media, Codec Working Group, Document CWG-B018_v1, Feb. 24, 2021.

Lu, Lester (Keng-Shih) et al., "Optical Flow Motion Vector Refinement for AV2", Alliance for Open Media Codec Working Group, Document CWG-B041_v3, Sep. 20, 2021.

Zhao, Leo et al., "Advanced motion vector difference coding", Alliance for Open Media, Codec Working Group, Document CWG-B092, Nov. 24, 2021.

Zhao, Leo et al., "Improved adaptive MVD resolution", Alliance for Open Media, Codec Working Group, Document CWG-C011, Feb. 9, 2022.

Zhao, Xin et al., "Tool Description for AV1 and libaom", Alliance for Open Media Codec Working Group, Document CWG-B078_v1, Oct. 4, 2021.

* cited by examiner

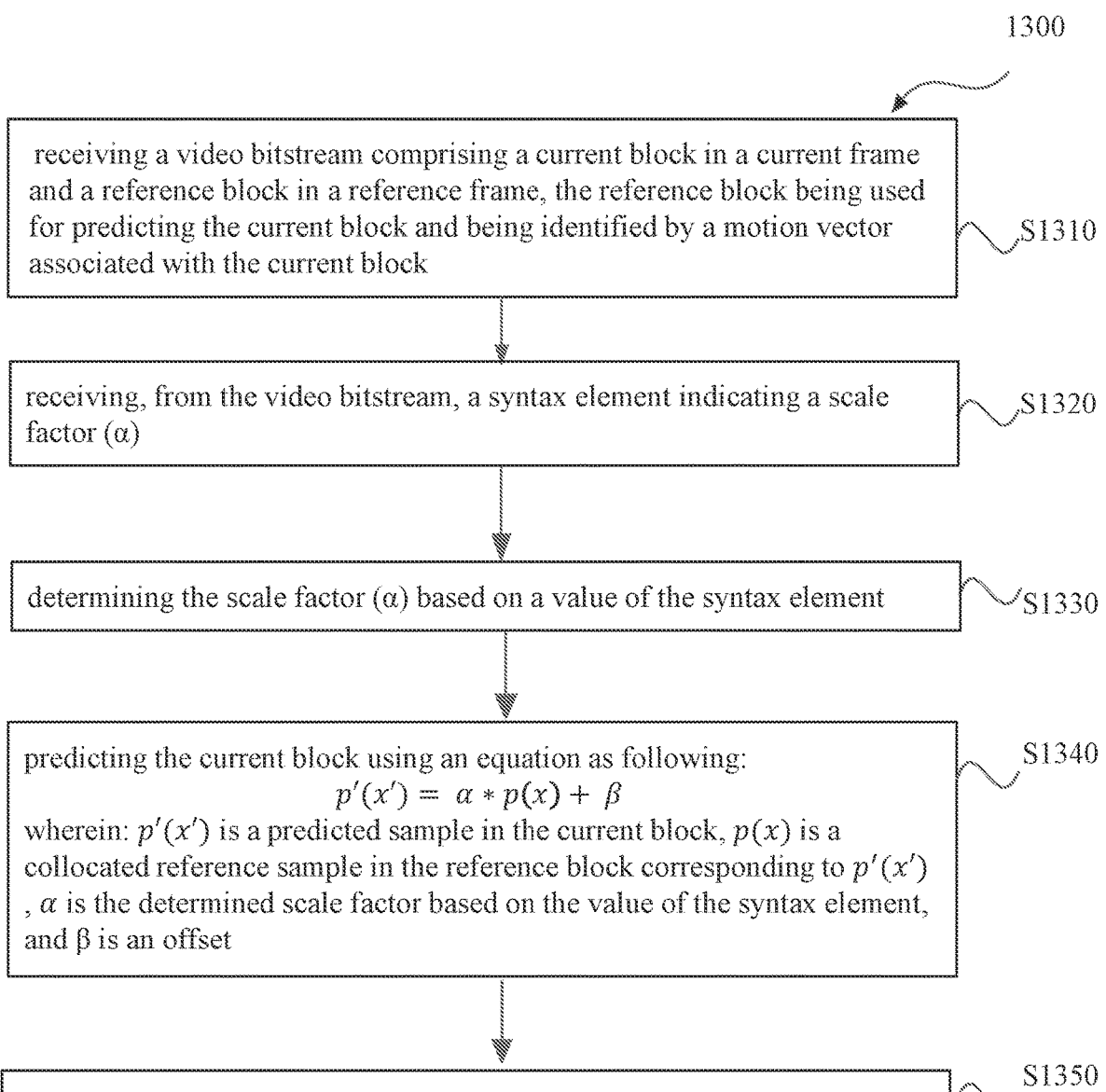

1300 receiving a video bitstream comprising a current block in a current frame and a reference block in a reference frame, the reference block being used for predicting the current block and being identified by a motion vector associated with the current block ⟶ S1310 receiving, from the video bitstream, a syntax element indicating a scale factor (α) ⟶ S1320 determining the scale factor (α) based on a value of the syntax element ⟶ S1330 predicting the current block using an equation as following:
$$p'(x') = \alpha * p(x) + \beta$$
wherein: $p'(x')$ is a predicted sample in the current block, $p(x)$ is a collocated reference sample in the reference block corresponding to $p'(x')$, $\alpha$ is the determined scale factor based on the value of the syntax element, and $\beta$ is an offset ⟶ S1340 reconstructing the current block based on the predicted current block ⟶ S1350

*FIG. 13*

EXPLICIT SIGNALING FOR BLOCK BASED ADAPTIVE WEIGHTING FACTORS

INCORPORATION BY REFERENCE

This application is based on and claims the benefit of priority to U.S. Provisional Application No. 63/459,565, filed on Apr. 14, 2023, which is herein incorporated by reference in its entirety.

TECHNICAL FIELD

This disclosure describes a set of advanced video/streaming coding/decoding technologies. More specifically, the disclosed technology involves enhancement on Block Adaptive Weighted Prediction (BAWP) and Local Illumination Compensation (LIC) to compensate local illumination variation.

BACKGROUND

Uncompressed digital video can include a series of pictures, and may specific bitrate requirements for storage, data processing, and for transmission bandwidth in streaming applications. One purpose of video coding and decoding can be the reduction of redundancy in the uncompressed input video signal, through various compression techniques.

SUMMARY

The present disclosure describes various embodiments of methods, apparatus, and computer-readable storage medium for enhancing block adaptive weighted prediction (BAWP) to model local illumination compensation (LIC).

According to one aspect, an embodiment of the present disclosure provides a method for decoding a current block of a current frame in a coded video bitstream. receiving a video bitstream comprising a current block and a reference block, the reference block being used for predicting the current block and being identified by a motion vector associated with the current block; receiving, from the video bitstream, a syntax element indicating a scale factor ($\alpha$); determining the scale factor ($\alpha$) based on a value of the syntax element; predicting the current block using an equation $p'(x')=\alpha*p(x)+\beta$, where: $p'(x')$ is a predicted sample in the current block, $p(x)$ is a collocated reference sample in the reference block corresponding to $p(x)$, $\alpha$ is the determined scale factor based on the value of the syntax element, and $\beta$ is an offset; and reconstructing the current block based on the predicted current block.

According to another aspect, an embodiment of the present disclosure provides an apparatus for processing a current block of a current frame in a coded video bitstream. The apparatus includes a memory storing instructions; and a processor in communication with the memory. When the processor executes the instructions, the processor is configured to cause the apparatus to perform the above methods for video decoding and/or encoding.

In another aspect, an embodiment of the present disclosure provides non-transitory computer-readable mediums storing instructions which when executed by a computer for video decoding and/or encoding cause the computer to perform the above methods for video decoding and/or encoding.

The above and other aspects and their implementations are described in greater detail in the drawings, the descriptions, and the claims.

BRIEF DESCRIPTION OF THE DRAWINGS

Further features, the nature, and various advantages of the disclosed subject matter will be more apparent from the following detailed description and the accompanying drawings in which:

FIG. 13 shows an example logic flow for a method in the present disclosure.

DETAILED DESCRIPTION OF EMBODIMENTS

The invention will now be described in detail hereinafter with reference to the accompanied drawings, which form a part of the present invention, and which show, by way of illustration, specific examples of embodiments. Please note that the invention may, however, be embodied in a variety of different forms and, therefore, the covered or claimed subject matter is intended to be construed as not being limited to any of the embodiments to be set forth below. Please also note that the invention may be embodied as methods, devices, components, or systems. Accordingly, embodiments of the invention may, for example, take the form of hardware, software, firmware or any combination thereof.

Throughout the specification and claims, terms may have nuanced meanings suggested or implied in context beyond an explicitly stated meaning. The phrase "in one embodiment" or "in some embodiments" as used herein does not necessarily refer to the same embodiment and the phrase "in another embodiment" or "in other embodiments" as used herein does not necessarily refer to a different embodiment. Likewise, the phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments/implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

Figure 1:
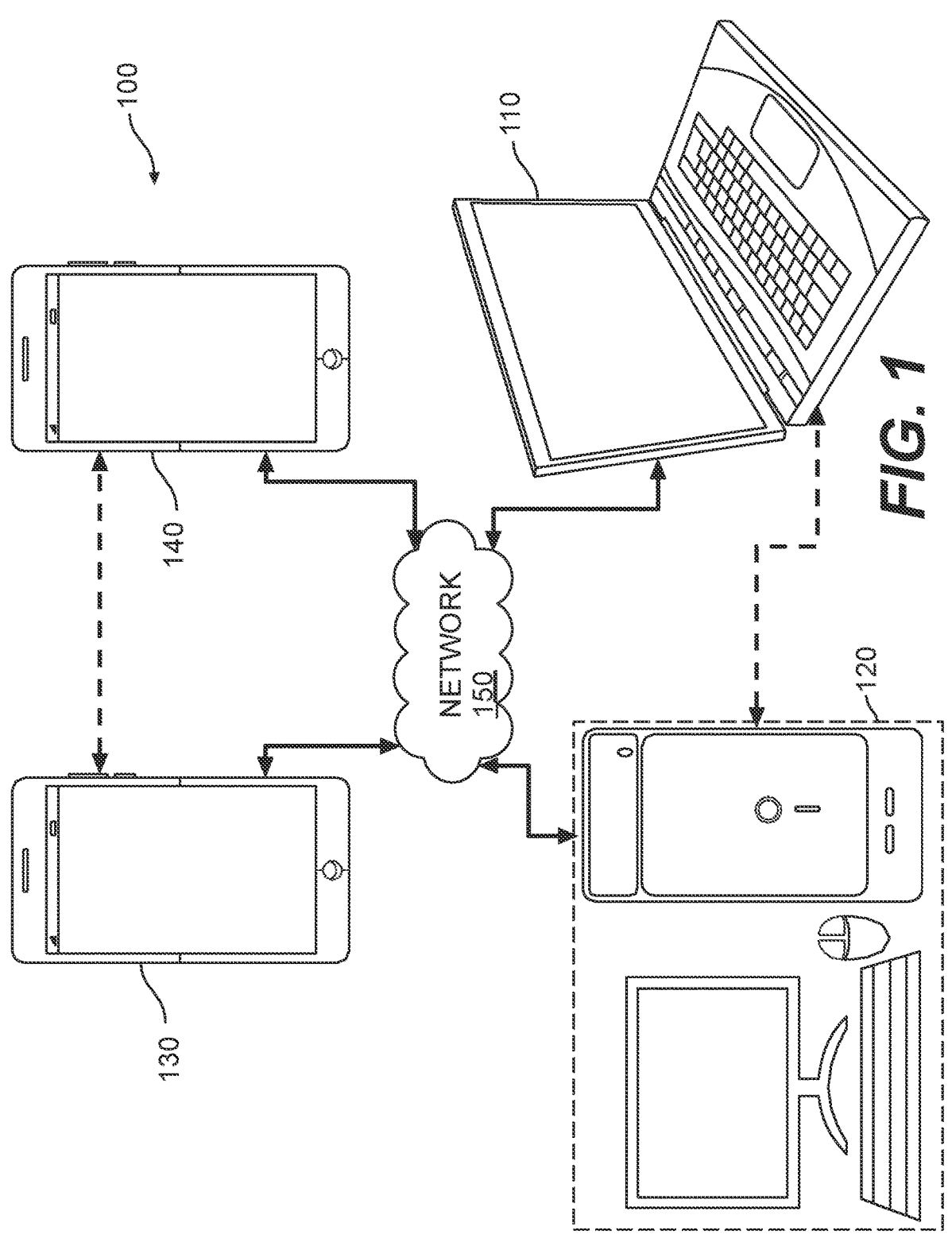
FIG. 1 shows a schematic illustration of a simplified block diagram of a communication system (100) in accordance with an example embodiment.

As shown in FIG. 1, terminal devices may be implemented as servers, personal computers and smart phones but the applicability of the underlying principles of the present disclosure may not be so limited. Embodiments of the present disclosure may be implemented in desktop computers, laptop computers, tablet computers, media players, wearable computers, dedicated video conferencing equipment, and/or the like. The network (150) represents any number or types of networks that convey coded video data among the terminal devices, including for example wireline (wired) and/or wireless communication networks. The communication network (150) may exchange data in circuit-switched, packet-switched, and/or other types of channels. Representative networks include telecommunications networks, local area networks, wide area networks and/or the Internet.

Figure 2:
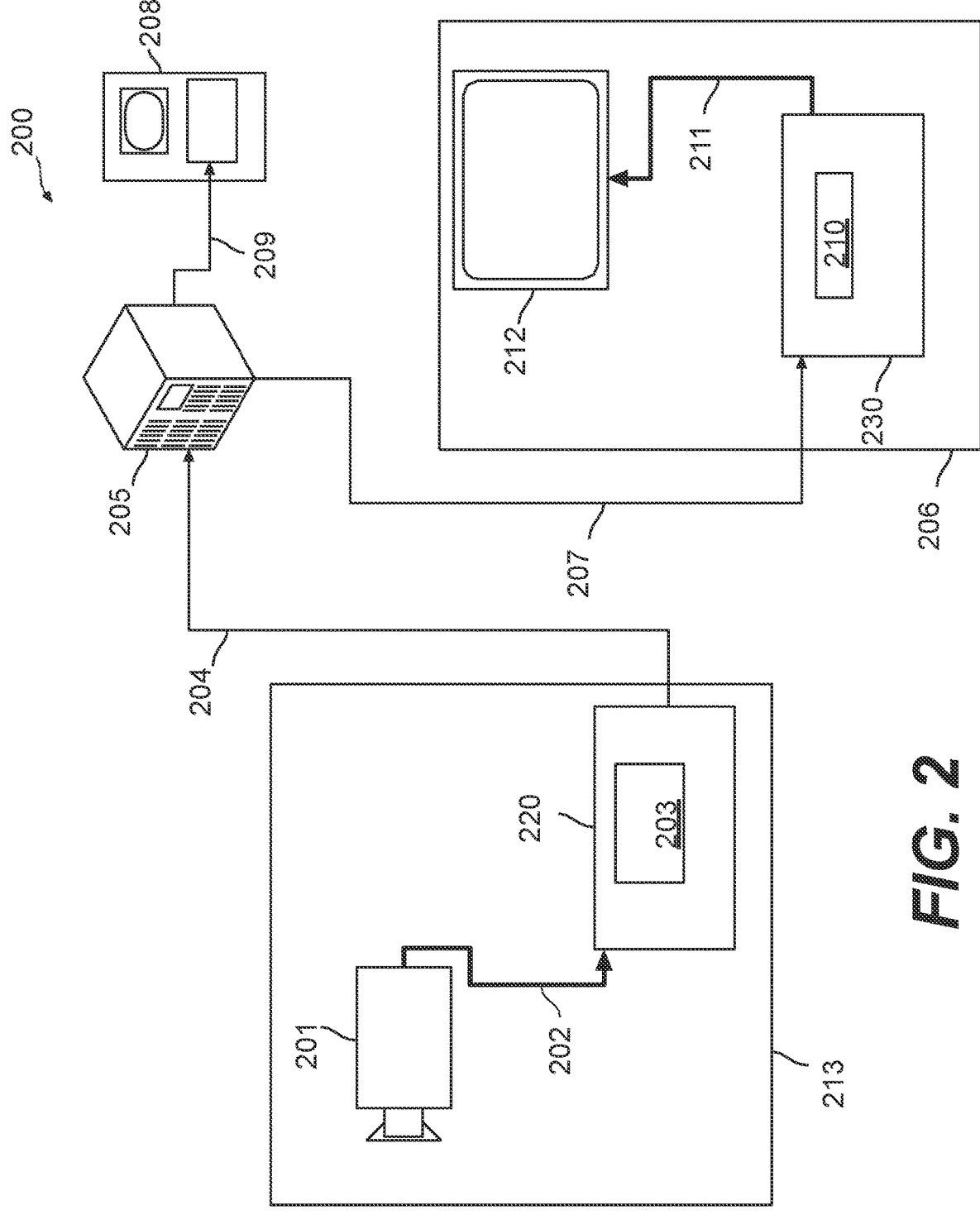
FIG. 2 shows a schematic illustration of a simplified block diagram of a communication system (200) in accordance with an example embodiment.

FIG. 2 illustrates, as an example for an application for the disclosed subject matter, a placement of a video encoder and a video decoder in a video streaming environment. The disclosed subject matter may be equally applicable to other video applications, including, for example, video conferencing, digital TV broadcasting, gaming, virtual reality, storage of compressed video on digital media including CD, DVD, memory stick and the like, and so on.

As shown in FIG. 2, a video streaming system may include a video capture subsystem (213) that can include a video source (201), e.g., a digital camera, for creating a stream of video pictures or images (202) that are uncompressed. In an example, the stream of video pictures (202) includes samples that are recorded by a digital camera of the video source (201). The stream of video pictures (202), depicted as a bold line to emphasize a high data volume when compared to encoded video data (204) (or coded video bitstreams), can be processed by an electronic device (220) that includes a video encoder (203) coupled to the video source (201). The video encoder (203) can include hardware, software, or a combination thereof to enable or implement aspects of the disclosed subject matter as described in more detail below. The encoded video data (204) (or encoded video bitstream (204)), depicted as a thin line to emphasize a lower data volume when compared to the stream of uncompressed video pictures (202), can be stored on a streaming server (205) for future use or directly to downstream video devices (not shown). One or more streaming client subsystems, such as client subsystems (206) and (208) in FIG. 2 can access the streaming server (205) to retrieve copies (207) and (209) of the encoded video data (204). A client subsystem (206) can include a video decoder (210), for example, in an electronic device (230). The video decoder (210) decodes the incoming copy (207) of the encoded video data and creates an outgoing stream of video pictures (211) that are uncompressed and that can be rendered on a display (212) (e.g., a display screen) or other rendering devices (not depicted).

Figure 3:
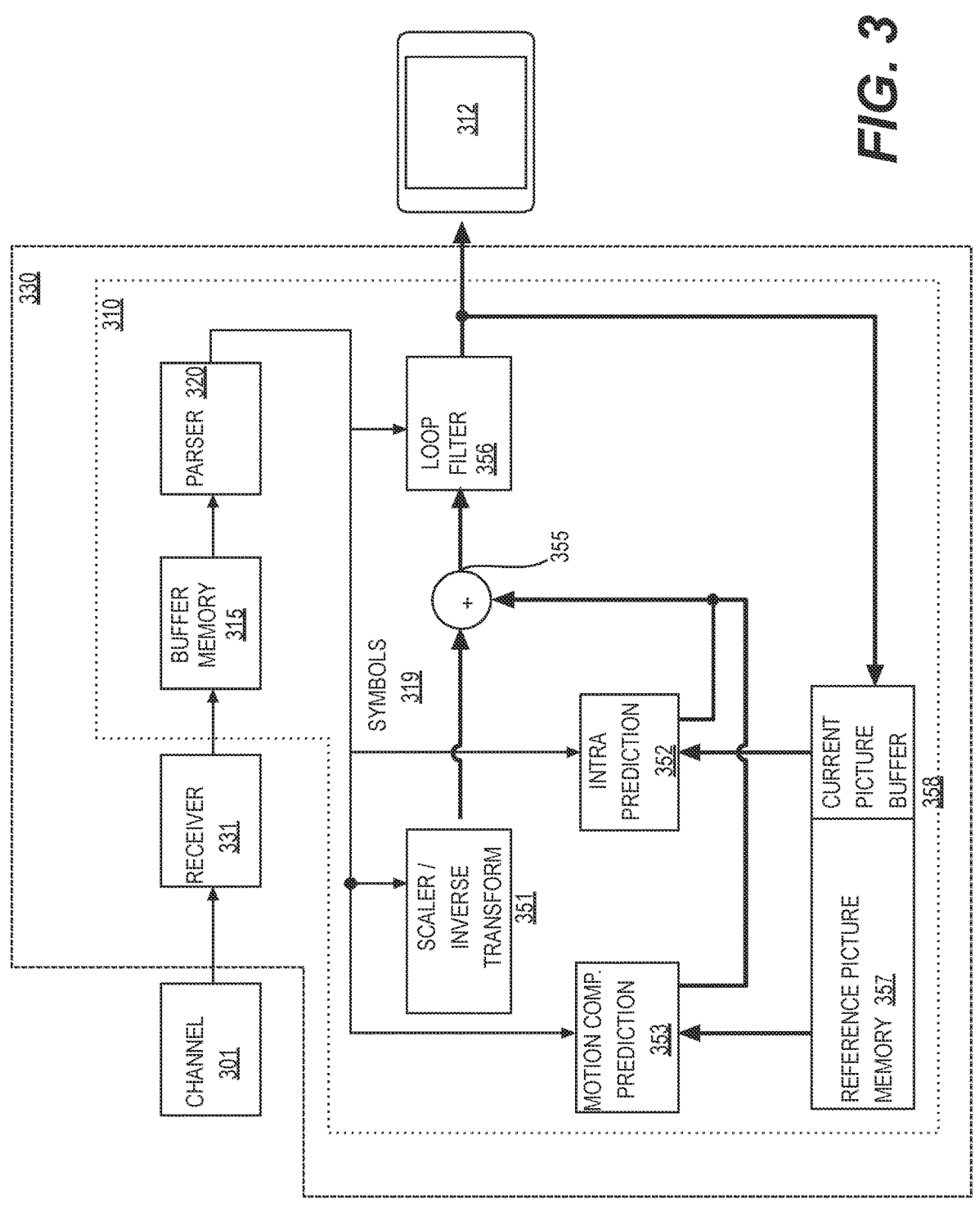
FIG. 3 shows a schematic illustration of a simplified block diagram of a video decoder in accordance with an example embodiment.

FIG. 3 shows a block diagram of a video decoder (310) of an electronic device (330) according to any embodiment of the present disclosure below. The electronic device (330) can include a receiver (331) (e.g., receiving circuitry). The video decoder (310) can be used in place of the video decoder (210) in the example of FIG. 2.

As shown, in FIG. 3, the receiver (331) may receive one or more coded video sequences from a channel (301). To combat network jitter and/or handle playback timing, a buffer memory (315) may be disposed in between the receiver (331) and an entropy decoder/parser (320) ("parser (320)" henceforth). The parser (320) may reconstruct symbols (321) from the coded video sequence. Categories of those symbols include information used to manage operation of the video decoder (310), and potentially information to control a rendering device such as display (312) (e.g., a display screen). The parser (320) may parse/entropy-decode the coded video sequence. The parser (320) may extract from the coded video sequence, a set of subgroup parameters for at least one of the subgroups of pixels in the video decoder. The subgroups can include Groups of Pictures (GOPs), pictures, tiles, slices, macroblocks, Coding Units (CUs), blocks, Transform Units (TUs), Prediction Units (PUs) and so forth. The parser (320) may also extract from the coded video sequence information such as transform coefficients (e.g., Fourier transform coefficients), quantizer parameter values, motion vectors, and so forth. Reconstruction of the symbols (321) can involve multiple different processing or functional units. The units that are involved and how they are involved may be controlled by the subgroup control information that was parsed from the coded video sequence by the parser (320).

A first unit may include the scaler/inverse transform unit (351). The scaler/inverse transform unit (351) may receive a quantized transform coefficient as well as control information, including information indicating which type of inverse transform to use, block size, quantization factor/parameters, quantization scaling matrices, and the lie as symbol(s) (321) from the parser (320). The scaler/inverse transform unit (351) can output blocks comprising sample values that can be input into aggregator (355).

In some cases, the output samples of the scaler/inverse transform (351) can pertain to an intra coded block, i.e., a block that does not use predictive information from previously reconstructed pictures, but can use predictive information from previously reconstructed parts of the current picture. Such predictive information can be provided by an intra picture prediction unit (352). In some cases, the intra picture prediction unit (352) may generate a block of the same size and shape of the block under reconstruction using surrounding block information that is already reconstructed and stored in the current picture buffer (358). The current picture buffer (358) buffers, for example, partly reconstructed current picture and/or fully reconstructed current picture. The aggregator (355), in some implementations, may add, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a motion compensation prediction unit (353) can access reference picture memory (357) based on motion vector to fetch samples used for inter-picture prediction. After motion compensating the fetched reference samples in accordance with the symbols (321) pertaining to the block, these samples can be added by the aggregator (355) to the output of the scaler/inverse transform unit (351) (output of unit 351 may be referred to as the residual samples or residual signal) so as to generate output sample information.

The output samples of the aggregator (355) can be subject to various loop filtering techniques in the loop filter unit (356) including several types of loop filters. The output of the loop filter unit (356) can be a sample stream that can be output to the rendering device (312) as well as stored in the reference picture memory (357) for use in future inter-picture prediction.

Figure 4:
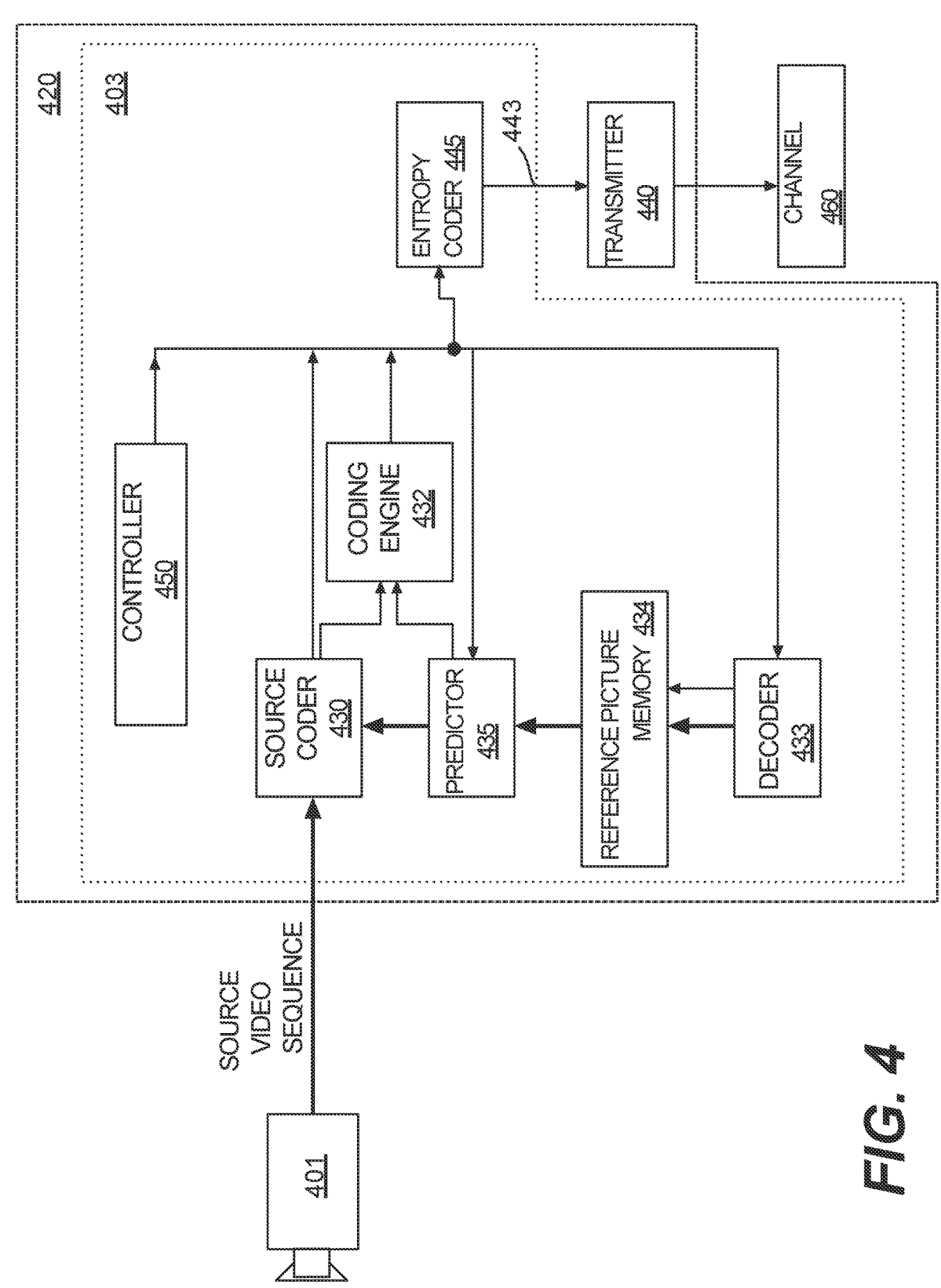
FIG. 4 shows a schematic illustration of a simplified block diagram of a video encoder in accordance with an example embodiment.

FIG. 4 shows a block diagram of a video encoder (403) according to an example embodiment of the present disclosure. The video encoder (403) may be included in an electronic device (420). The electronic device (420) may further include a transmitter (440) (e.g., transmitting circuitry). The video encoder (403) can be used in place of the video encoder (403) in the example of FIG. 4.

The video encoder (403) may receive video samples from a video source (401). According to some example embodiments, the video encoder (403) may code and compress the pictures of the source video sequence into a coded video sequence (443) in real time or under any other time constraints as required by the application. Enforcing appropriate coding speed constitutes one function of a controller (450). In some embodiments, the controller (450) may be functionally coupled to and control other functional units as described below. Parameters set by the controller (450) can include rate control related parameters (picture skip, quantizer, lambda value of rate-distortion optimization techniques, . . . ), picture size, group of pictures (GOP) layout, maximum motion vector search range, and the like.

In some example embodiments, the video encoder (403) may be configured to operate in a coding loop. The coding loop can include a source coder (430), and a (local) decoder (433) embedded in the video encoder (403). The decoder (433) reconstructs the symbols to create the sample data in a similar manner as a (remote) decoder would create even though the embedded decoder 433 process coded video steam by the source coder 430 without entropy coding (as any compression between symbols and coded video bitstream in entropy coding may be lossless in the video compression technologies considered in the disclosed subject matter). An observation that can be made at this point is that any decoder technology except the parsing/entropy decoding that may only be present in a decoder also may necessarily need to be present, in substantially identical functional form, in a corresponding encoder. For this reason, the disclosed subject matter may at times focus on decoder operation, which allies to the decoding portion of the encoder. The description of encoder technologies can thus be abbreviated as they are the inverse of the comprehensively described decoder technologies. Only in certain areas or aspects a more detail description of the encoder is provided below.

During operation in some example implementations, the source coder (430) may perform motion compensated predictive coding, which codes an input picture predictively with reference to one or more previously coded picture from the video sequence that were designated as "reference pictures."

The local video decoder (433) may decode coded video data of pictures that may be designated as reference pictures. The local video decoder (433) replicates decoding processes that may be performed by the video decoder on reference pictures and may cause reconstructed reference pictures to be stored in a reference picture cache (434). In this manner, the video encoder (403) may store copies of reconstructed reference pictures locally that have common content as the reconstructed reference pictures that will be obtained by a far-end (remote) video decoder (absent transmission errors).

The predictor (435) may perform prediction searches for the coding engine (432). That is, for a new picture to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures.

The controller (450) may manage coding operations of the source coder (430), including, for example, setting of parameters and subgroup parameters used for encoding the video data.

Output of all aforementioned functional units may be subjected to entropy coding in the entropy coder (445). The transmitter (440) may buffer the coded video sequence(s) as created by the entropy coder (445) to prepare for transmission via a communication channel (460), which may be a hardware/software link to a storage device which would store the encoded video data. The transmitter (440) may merge coded video data from the video coder (403) with other data to be transmitted, for example, coded audio data and/or ancillary data streams (sources not shown).

The controller (450) may manage operation of the video encoder (403). During coding, the controller (450) may assign to each coded picture a certain coded picture type, which may affect the coding techniques that may be applied to the respective picture. For example, pictures often may be assigned as one of the following picture types: an Intra Picture (I picture), a predictive picture (P picture), a bi-directionally predictive picture (B Picture), a multiple-predictive picture. Source pictures commonly may be subdivided spatially into a plurality of sample coding blocks as described in further detail below.

Figure 5:
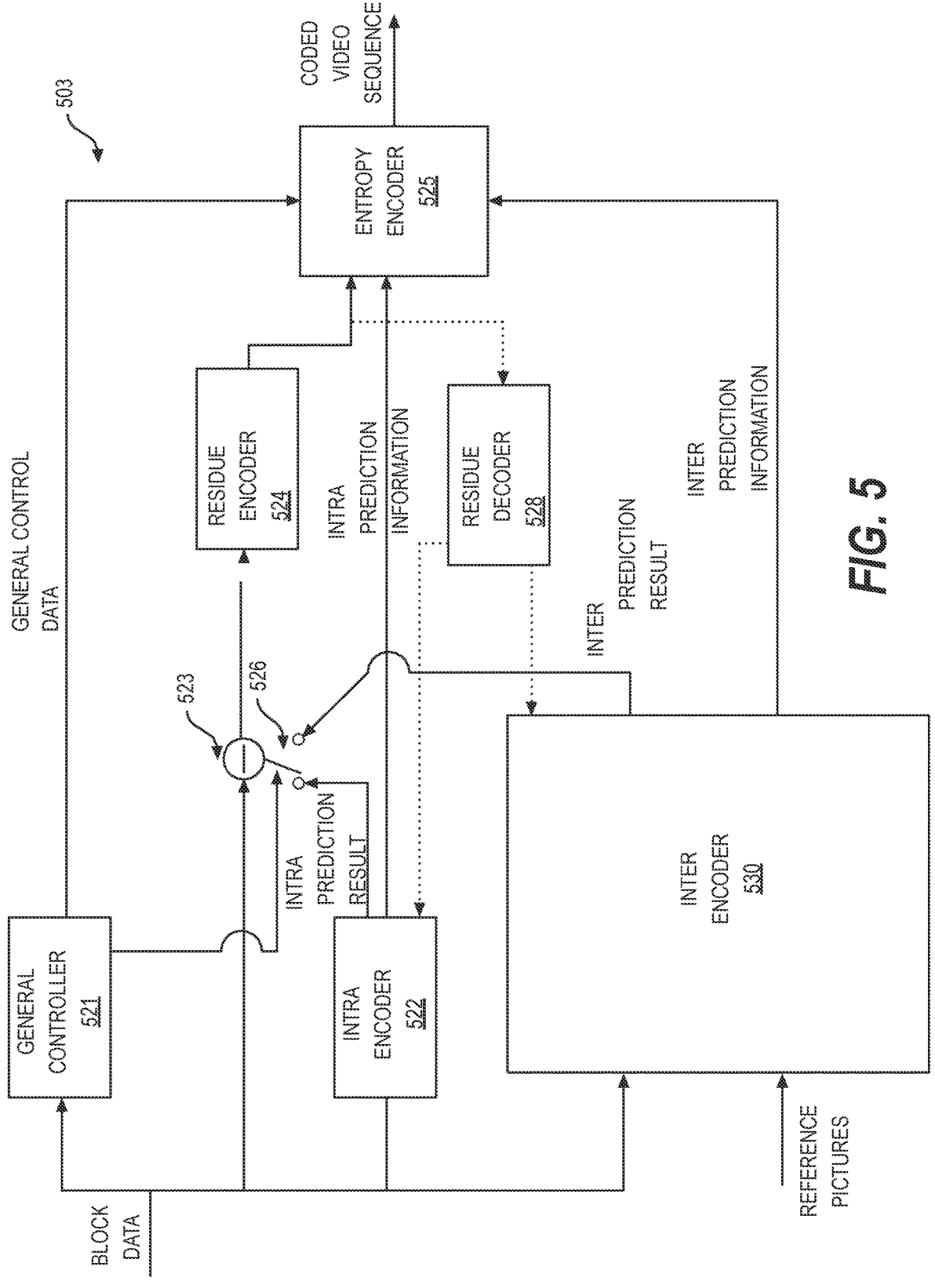
FIG. 5 shows a block diagram of a video encoder in accordance with another example embodiment.

FIG. 5 shows a diagram of a video encoder (503) according to another example embodiment of the disclosure. The video encoder (503) is configured to receive a processing block (e.g., a prediction block) of sample values within a current video picture in a sequence of video pictures, and encode the processing block into a coded picture that is part of a coded video sequence. The example video encoder (503) may be used in place of the video encoder (403) in the FIG. 4 example.

For example, the video encoder (503) receives a matrix of sample values for a processing block. The video encoder (503) then determines whether the processing block is best coded using intra mode, inter mode, or bi-prediction mode using, for example, rate-distortion optimization (RDO).

In the example of FIG. 5, the video encoder (503) includes an inter encoder (530), an intra encoder (522), a residue calculator (523), a switch (526), a residue encoder (524), a general controller (521), and an entropy encoder (525) coupled together as shown in the example arrangement in FIG. 5.

The inter encoder (530) is configured to receive the samples of the current block (e.g., a processing block), compare the block to one or more reference blocks in reference pictures (e.g., blocks in previous pictures and later pictures in display order), generate inter prediction information (e.g., description of redundant information according to inter encoding technique, motion vectors, merge mode information), and calculate inter prediction results (e.g., predicted block) based on the inter prediction information using any suitable technique.

The intra encoder (522) is configured to receive the samples of the current block (e.g., a processing block), compare the block to blocks already coded in the same picture, and generate quantized coefficients after transform, and in some cases also to generate intra prediction information (e.g., an intra prediction direction information according to one or more intra encoding techniques).

The general controller (521) may be configured to determine general control data and control other components of the video encoder (503) based on the general control data to, for example, determine the prediction mode of the block and provides a control signal to the switch (526) based on the prediction mode.

The residue calculator (523) may be configured to calculate a difference (residue data) between the received block and prediction results for the block selected from the intra encoder (522) or the inter encoder (530). The residue encoder (524) may be configured to encode the residue data to generate transform coefficients. The transform coefficients are then subject to quantization processing to obtain quantized transform coefficients. In various example embodiments, the video encoder (503) also includes a residual decoder (528). The residual decoder (528) is configured to perform inverse-transform, and generate the decoded residue data. The entropy encoder (525) may be configured to format the bitstream to include the encoded block and perform entropy coding.

Figure 6:
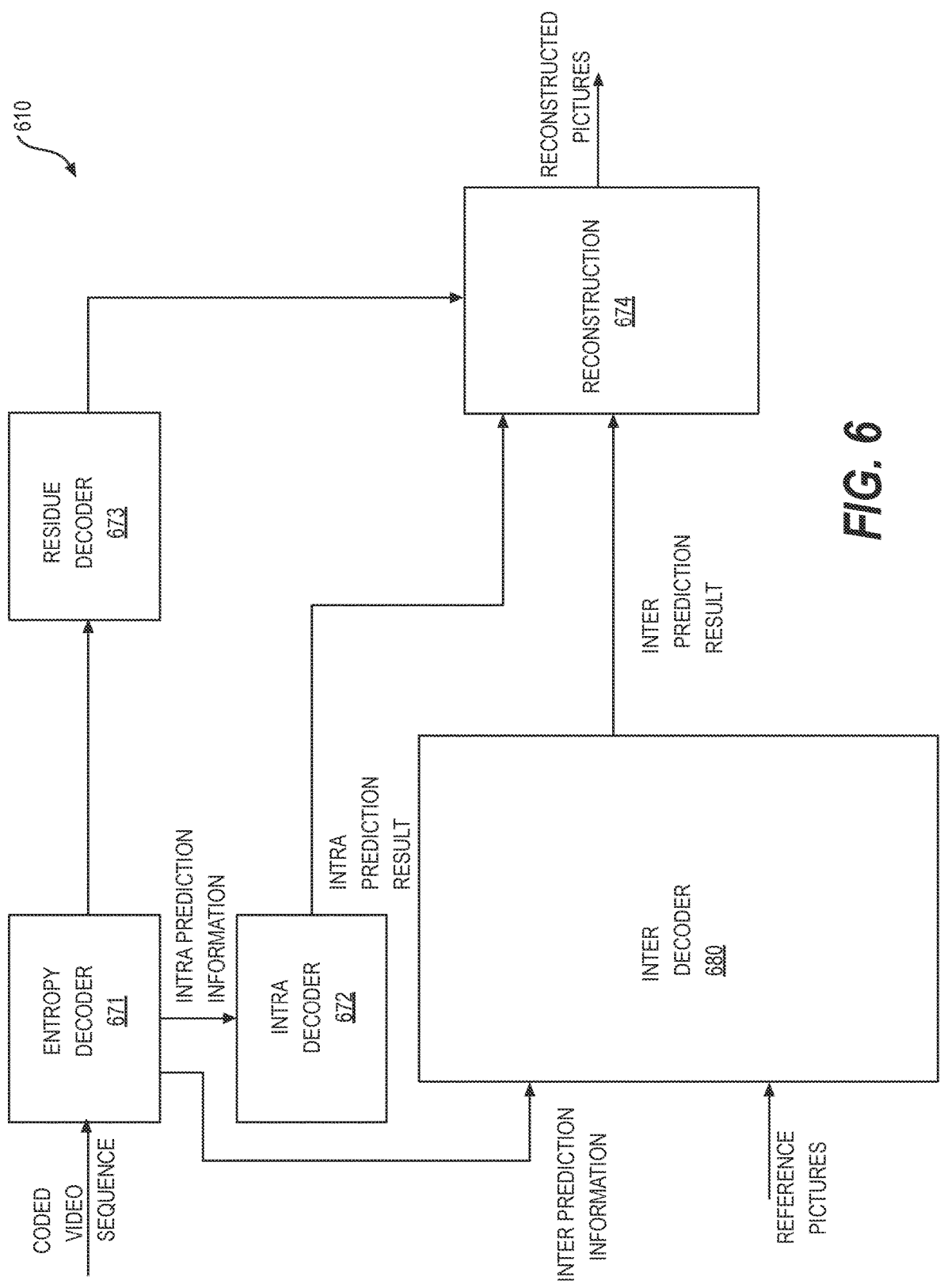
FIG. 6 shows a block diagram of a video decoder in accordance with another example embodiment.

FIG. 6 shows a diagram of an example video decoder (610) according to another embodiment of the disclosure. The video decoder (610) is configured to receive coded pictures that are part of a coded video sequence, and decode the coded pictures to generate reconstructed pictures. In an example, the video decoder (610) may be used in place of the video decoder (410) in the example of FIG. 4.

In the example of FIG. 6, the video decoder (610) includes an entropy decoder (671), an inter decoder (680), a residual decoder (673), a reconstruction module (674), and an intra decoder (672) coupled together as shown in the example arrangement of FIG. 6.

The entropy decoder (671) can be configured to reconstruct, from the coded picture, certain symbols that represent the syntax elements of which the coded picture is made up. The inter decoder (680) may be configured to receive the inter prediction information, and generate inter prediction results based on the inter prediction information. The intra decoder (672) may be configured to receive the intra prediction information, and generate prediction results based on the intra prediction information. The residual decoder (673) may be configured to perform inverse quantization to extract de-quantized transform coefficients, and process the de-quantized transform coefficients to convert the residual from the frequency domain to the spatial domain. The reconstruction module (674) may be configured to combine, in the spatial domain, the residual as output by the residual decoder (673) and the prediction results (as output by the inter or intra prediction modules as the case may be) to form a reconstructed block forming part of the reconstructed picture as part of the reconstructed video.

It is noted that the video encoders (203), (403), and (503), and the video decoders (210), (310), and (610) can be implemented using any suitable technique. In some example embodiments, the video encoders (203), (403), and (503), and the video decoders (210), (310), and (610) can be implemented using one or more integrated circuits. In another embodiment, the video encoders (203), (403), and (503), and the video decoders (210), (310), and (610) can be implemented using one or more processors that execute software instructions.

Turning to block partitioning for coding and decoding, general partitioning may start from a base block and may follow a predefined ruleset, particular patterns, partition trees, or any partition structure or scheme. The partitioning may be hierarchical and recursive. After dividing or partitioning a base block following any of the example partitioning procedures or other procedures described below, or the combination thereof, a final set of partitions or coding blocks may be obtained. Each of these partitions may be at one of various partitioning levels in the partitioning hierarchy, and may be of various shapes. Each of the partitions may be referred to as a coding block (CB). For the various example partitioning implementations described further below, each resulting CB may be of any of the allowed sizes and partitioning levels. Such partitions are referred to as coding blocks because they may form units for which some basic coding/decoding decisions may be made and coding/decoding parameters may be optimized, determined, and signaled in an encoded video bitstream. The highest or deepest level in the final partitions represents the depth of the coding block partitioning structure of tree. A coding block may be a luma coding block or a chroma coding block. The CB tree structure of each color may be referred to as coding block tree (CBT). The coding blocks of all color channels may collectively be referred to as a coding unit (CU). The hierarchical structure of for all color channels may be collectively referred to as coding tree unit (CTU). The partitioning patterns or structures for the various color channels in in a CTU may or may not be the same.

In some implementations, partition tree schemes or structures used for the luma and chroma channels may not need to be the same. In other words, luma and chroma channels may have separate coding tree structures or patterns. Further, whether the luma and chroma channels use the same or different coding partition tree structures and the actual coding partition tree structures to be used may depend on whether the slice being coded is a P, B, or I slice. For example, For an I slice, the chroma channels and luma channel may have separate coding partition tree structures or coding partition tree structure modes, whereas for a P or B slice, the luma and chroma channels may share a same coding partition tree scheme. When separate coding partition tree structures or modes are applied, a luma channel may be partitioned into CBs by one coding partition tree structure, and a chroma channel may be partitioned into chroma CBs by another coding partition tree structure.

Figure 7:
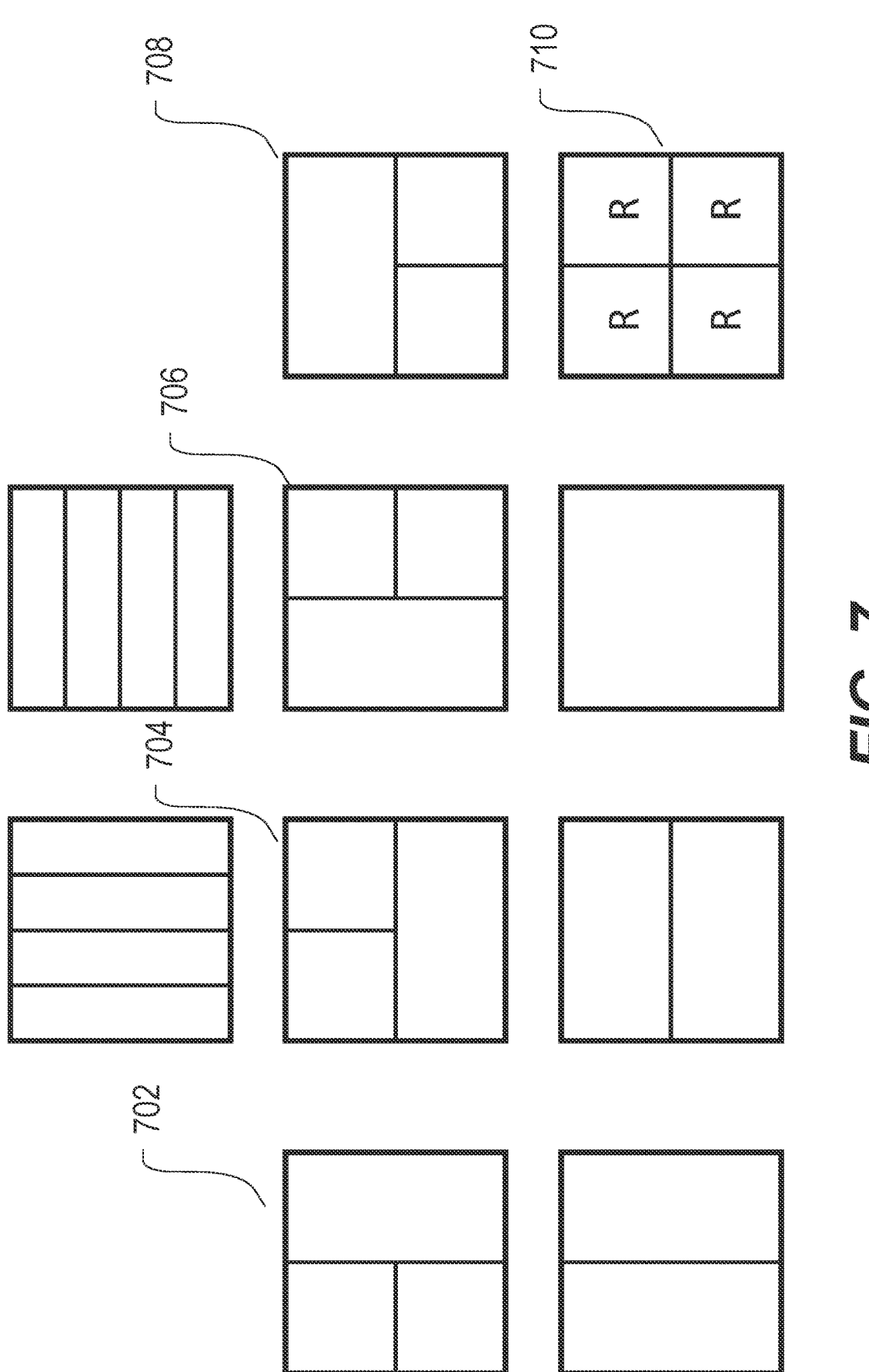
FIG. 7 shows a scheme of coding block partitioning according to example embodiments of the disclosure.

FIG. 7 shows an example predefined 10-way partitioning structure/pattern allowing recursive partitioning to form a partitioning tree. The root block may start at a predefined level (e.g. from a base block at 128×128 or 64×64 level). The example partitioning structure of FIG. 7 includes various 2:1/1:2 and 4:1/1:4 rectangular partitions. In some example implementations, none of the rectangular partitions of FIG. 7 is allowed to be further subdivided. A coding tree depth may be further defined to indicate the splitting depth from the root node or root block. For example, the coding tree depth for the root node or root block may be set to 0, and after the root block is further split once following FIG. 7, the coding tree depth is increased by 1. In some implementations, only the all-square partitions in 710 may be allowed for recursive partitioning into the next level of the partitioning tree following pattern of FIG. 7.

In some other example implementations for coding block partitioning, a quadtree structure may be used. Such quadtree splitting may be applied hierarchically and recursively to any square shaped partitions. Whether a base block or an intermediate block or partition is further quadtree split may be adapted to various local characteristics of the base block or intermediate block/partition.

Figures 8, 9:
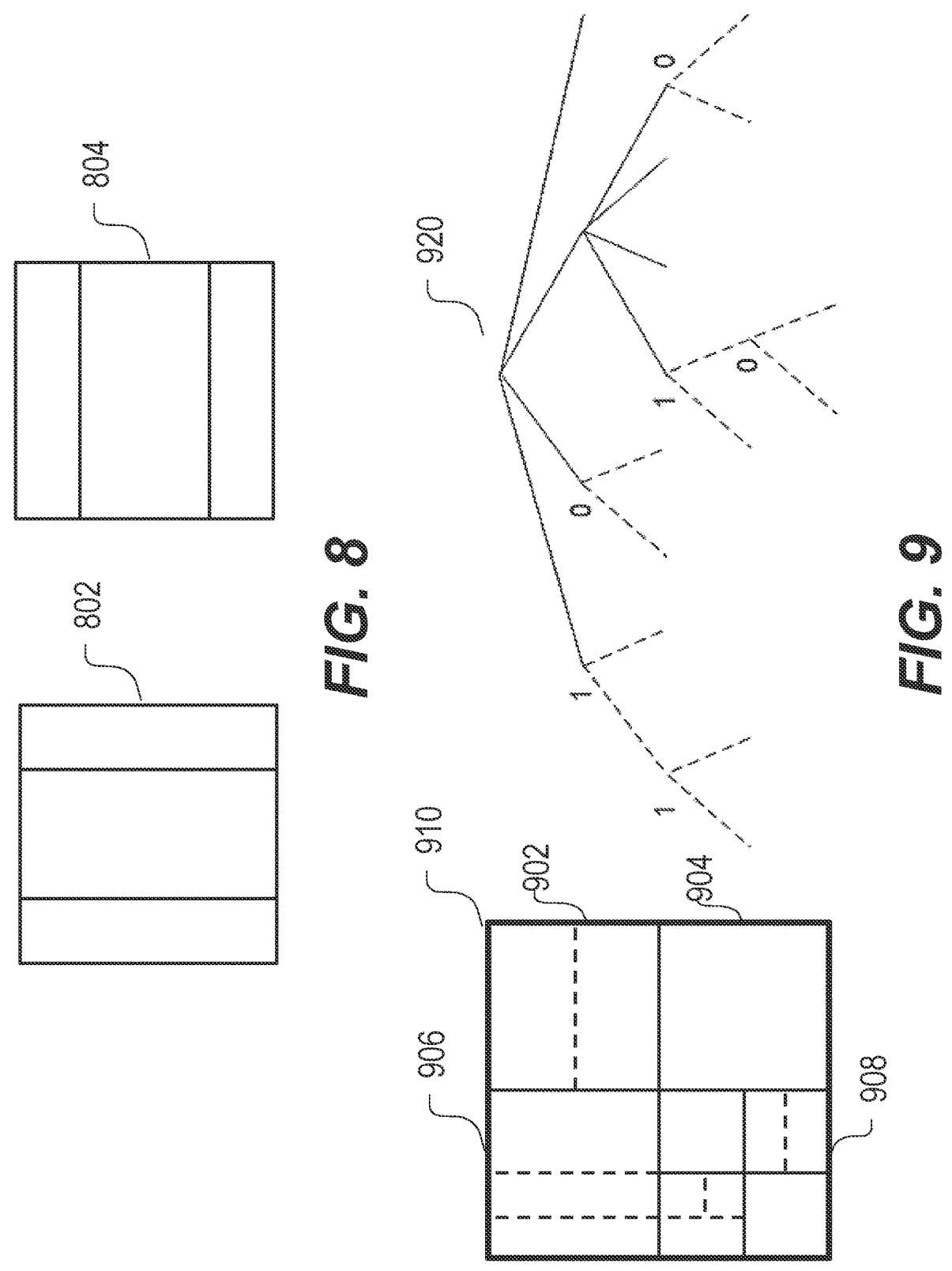
FIG. 8 shows another scheme of coding block partitioning according to example embodiments of the disclosure.
FIG. 9 shows another scheme of coding block partitioning according to example embodiments of the disclosure.
Figure 10:
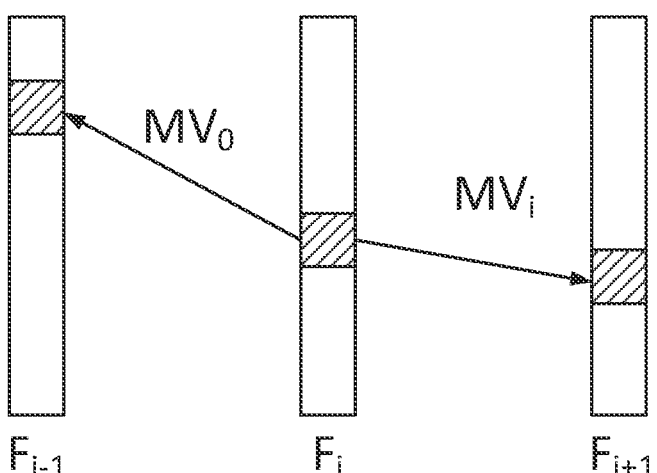
FIG. 10 illustrates compound motion compensation.
Figure 11:
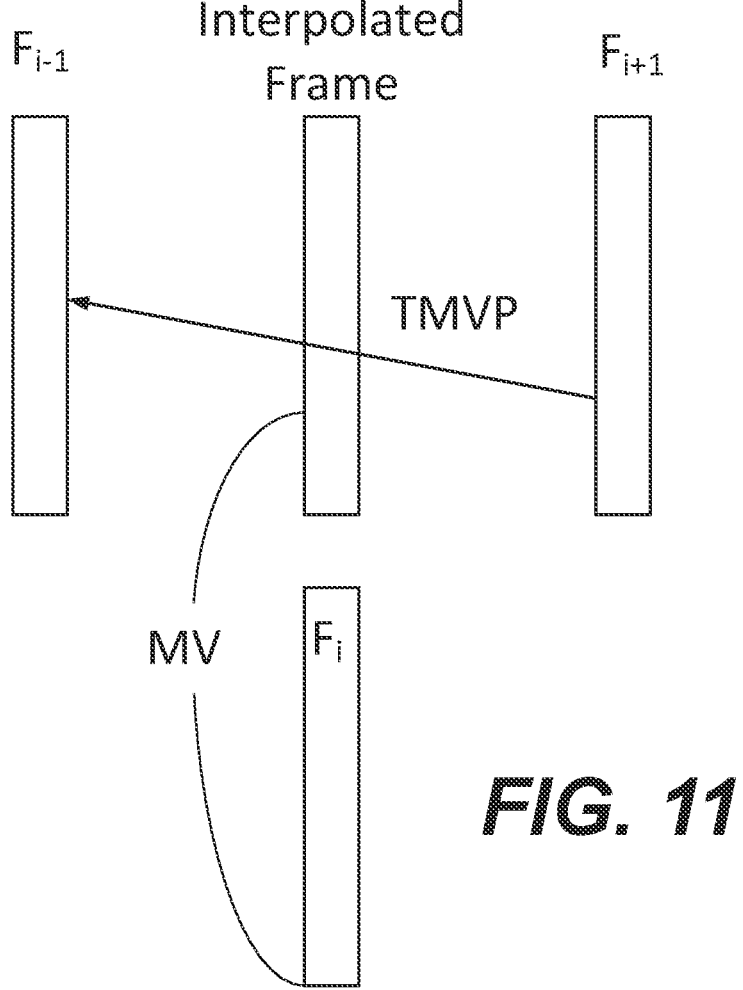
FIG. 11 illustrated example interpolated reference frame for motion compensation.

In yet some other examples, a ternary partitioning scheme may be used for partitioning a base block or any intermediate block, as shown in FIG. 8. The ternary pattern may be implemented vertical, as shown in 802, or horizontal, as shown in 804. While the example split ratio in FIG. 8 is shown as 1:2:1, other ratios may be predefined. In some implementations, two or more different ratios may be predefined. In some implementations, the width and height of the partitions of the example triple trees are always power of 2 to avoid additional transforms.

The above partitioning schemes may be combined in any manner at different partitioning levels. As one example, the quadtree and the binary partitioning schemes described above may be combined to partition a base block into a quadtree-binary-tree (QTBT) structure. In such a scheme, a base block or an intermediate block/partition may be either quadtree split or binary split, subject to a set of predefined conditions, if specified. A particular example is illustrated in FIG. 9, where a base block is first quadtree split into four partitions, as shown by 902, 904, 906, and 908. Thereafter, each of the resulting partitions is either quadtree partitioned into four further partitions (such as 908), or binarily split into two further partitions (either horizontally or vertically, such as 902 or 906, both being symmetric, for example) at the next level, or non-split (such as 904). Binary or quadtree splitting may be allowed recursively for square shaped partitions, as shown by the overall example partition pattern of 910 and the corresponding tree structure/representation in 920, in which the solid lines represent quadtree splitting, and the dashed lines represent binary splitting. Flags may be used for each binary splitting node (non-leaf binary partitions) to indicate whether the binary splitting is horizontal or vertical. For example, as shown in 920, consistent with the partitioning structure of 910, flag "0" may represent horizontal binary splitting, and flag "1" may represent vertical binary splitting. For the quadtree-split partition, there is no need to indicate the splitting type since quadtree splitting always splits a block or a partition both horizontally and vertically to produce 4 sub-blocks/partitions with an equal size. In some implementations, flag "1" may represent horizontal binary splitting, and flag "0" may represent vertical binary splitting.

In some example implementations of the QTBT, the quadtree and binary splitting ruleset may be represented by the following predefined parameters and the corresponding functions associated therewith:

CTU size: the root node size of a quadtree (size of a base block)

MinQTSize: the minimum allowed quadtree leaf node size

MaxBTSize: the maximum allowed binary tree root node size

MaxBTDepth: the maximum allowed binary tree depth

MinBTSize: the minimum allowed binary tree leaf node size

In some example implementations of the QTBT partitioning structure, the CTU size may be set as 128×128 luma samples with two corresponding 64×64 blocks of chroma samples (when an example chroma sub-sampling is considered and used), the MinQTSize may be set as 16×16, the MaxBTSize may be set as 64×64, the MinBTSize (for both width and height) may be set as 4×4, and the MaxBTDepth may be set as 4. The quadtree partitioning may be applied to the CTU first to generate quadtree leaf nodes. The quadtree leaf nodes may have a size from its minimum allowed size of 16×16 (i.e., the MinQTSize) to 128×128 (i.e., the CTU size). If a node is 128×128, it will not be first split by the binary tree since the size exceeds the MaxBTSize (i.e., 64×64). Otherwise, nodes which do not exceed MaxBTSize could be partitioned by the binary tree. In the example of FIG. 9, the base block is 128×128. The basic block can only be quadtree split, according to the predefined ruleset. The base block has a partitioning depth of 0. Each of the resulting four partitions are 64×64, not exceeding MaxBTSize, may be further quadtree or binary-tree split at level 1. The process continues. When the binary tree depth reaches MaxBTDepth (i.e., 4), no further splitting may be considered. When the binary tree node has width equal to MinBTSize (i.e., 4), no further horizontal splitting may be considered. Similarly, when the binary tree node has height equal to MinBTSize, no further vertical splitting is considered.

In some example implementations, the QTBT scheme above may be configured to support a flexibility for the luma and chroma to have the same QTBT structure or separate QTBT structures. For example, for P and B slices, the luma and chroma CTBs in one CTU may share the same QTBT structure. However, for I slices, the luma CTBs maybe partitioned into CBs by a QTBT structure, and the chroma CTBs may be partitioned into chroma CBs by another QTBT structure. This means that a CU may be used to refer to different color channels in an I slice, e.g., the I slice may consist of a coding block of the luma component or coding blocks of two chroma components, and a CU in a P or B slice may consist of coding blocks of all three colour components.

The various CB partitioning schemes above and the further partitioning of CBs into PBs may be combined in any manner. The following particular implementations are provided as non-limiting examples.

Inter-prediction may be implemented, for example, in a single-reference mode or a compound-reference mode. In some implementations, a skip flag may be first included in the bitstream for a current block (or at a higher level) to indicate whether the current block is inter-coded and is not to be skipped. If the current block is inter-coded, then another flag may be further included in the bitstream as a signal to indicate whether the single-reference mode or compound-reference mode is used for the prediction of the current block. For the single-reference mode, one reference block may be used to generate the prediction block for the current block. For the compound-reference mode, two or more reference blocks may be used to generate the prediction block by, for example, weighted average. The reference block or reference blocks may be identified using reference frame index or indices and additionally using corresponding motion vector or motion vectors which indicate shift(s) between the reference block(s) and the current blocks in location relative to a frame, e.g., in horizontal and vertical pixels. For example, the inter-prediction block for the current block may be generated from a single-reference block identified by one motion vector in a reference frame as the prediction block in the single-reference mode, whereas for the compound-reference mode, the prediction block may be generated by a weighted average of two reference blocks in two reference frames indicated by two reference frame indices and two corresponding motion vectors. The motion vector(s) may be coded and included in the bitstream in various manners.

In some example implementations, one or more reference picture lists containing identification of short-term and long-term reference frames for inter-prediction may be formed based on the information in the Reference Picture Set (RPS). For example, a single picture reference list may be formed for uni-directional inter-prediction, denoted as L0 reference (or reference list 0) whereas two picture referenced lists may be formed for bi-direction inter-prediction, denoted as L0 (or reference list 0) and L1 (or reference list 1) for each of the two prediction directions. The reference frames included in the L0 and L1 lists may be ordered in various predetermined manners. The lengths of the L0 and L1 lists may be signaled in the video bitstream. Uni-directional inter-prediction may be either in the single-reference mode, or in the compound-reference mode when the multiple references for the generation of prediction block by weighted average in the compound prediction mode are on a same side of the frame where the block to be predicted is located. Bi-directional inter-prediction may only be compound mode in that bi-directional inter-prediction involves at least two reference blocks.

In some implementations, a merge mode (MM) for inter-prediction may be implemented. Generally, for the merge mode, the motion vector in single-reference prediction or one or more of the motion vectors in compound-reference prediction for the current PB may be derived from other motion vector(s) rather than being computed and signaled independently. For example, in an encoding system, the current motion vector(s) for the current PB may be represented by difference(s) between the current motion vector(s) and other one or more already encoded motion vectors (referred to as reference motion vectors). Such difference(s) in motion vector(s) rather than the entirety of the current motion vector(s) may be encoded and included in the bit stream and may be linked to the reference motion vector(s). Correspondingly in a decoding system, the motion vector(s) corresponding to the current PB may be derived based on the decoded motion vector difference(s) and decoded reference motion vector(s) linked therewith. As a specific form of the general merge mode (MM) inter-prediction, such inter-prediction based on motion vector difference(s) may be referred to as Merge Mode with Motion Vector Difference (MMVD). MM in general or MMVD in particular may thus be implemented to leverage correlations between motion vectors associated with different PBs to improve coding efficiency. For example, neighboring PBs may have similar motion vectors and thus the MVD may be small and can be efficiently coded. For another example, motion vectors may correlate temporally (between frames) for similarly located/positioned blocks in space.

In some example implementations of MMVD, a list of reference motion vector (RMV) or MV predictor candidates for motion vector prediction may be formed for a block being predicted. The list of RMV candidates may contain a predetermined number (e.g., 2) of MV predictor candidate blocks whose motion vectors may be used for predicting the current motion vector. The RMV candidate blocks may include blocks selected from neighboring blocks in the same frame and/or temporal blocks (e.g., identically located blocks in proceeding or subsequent frame of the current frame). These options represent blocks at spatial or temporal locations relative to the current block that are likely to have similar or identical motion vectors to the current block. The size of the list of MV predictor candidates may be predetermined. For example, the list may contain two or more candidates. To be on the list of RMV candidates, a candidate block, for example, may be required to have the same reference frame (or frames) as the current block, must exist (e.g., when the current block is near the edge of the frame, a boundary check needs to be performed), and must be already encoded during an encoding process, and/or already decoded during a decoding process. In some implementations, the list of merge candidates may be first populated with spatially neighboring blocks (scanned in particular predefined order) if available and meeting the conditions above, and then the temporal blocks if space is still available in the list. The neighboring RMV candidate blocks, for example, may be selected from left and top blocks of the current bock. The list of RMV predictor candidates may be dynamically formed at various levels (sequence, picture, frame, slice, superblock, etc.) as a Dynamic Reference List (DRL). DRL may be signaled in the bitstream.

In some implementations, an actual MV predictor candidate being used as a reference motion vector for predicting a motion vector of the current block may be signaled. In the case that the RMV candidate list contains two candidates, a one-bit flag, referred to as merge candidate flag may be used to indicate the selection of the reference merge candidate. For a current block being predicted in compound mode, each of the multiple motion vectors predicted using an MV predictor may be associated with reference motion vector from the merge candidate list. The encoder may determine which of the RMV candidate more closely predicts the MV of a current coding block and signal the selection as an index into the DRL.

In some example implementations of MMVD, after an RMV candidate is selected and used as base motion vector predictor for a motion vector to be predicted, a motion vector difference (MVD or a delta MV, representing the difference between the motion vector to be predicted and the reference candidate motion vector) may be calculated in the encoding system. Such MVD may include information representing a magnitude of MV difference and a direction of the MV difference, both of which may be signaled in the bitstream in various manners.

In some example implementations of the MMVD, a distance index may be used to specify magnitude information of the motion vector difference and to indicate one of a set of pre-defined offsets representing predefined motion vector difference from the starting point (the reference motion vector). An MV offset according to the signaled index may then be added to either horizontal or vertical component of the starting (reference) motion vector. An example predefined relation between distance index and predefined offsets is specified in Table 1.

TABLE 1

| Example relation of distance index and pre-defined MV offset | | | | | | | |
|---|---|---|---|---|---|---|---|
| Distance Index | 0 | 1 | 2 | 3 | 4 | 5 | 6 | 7 |
| Offset (in unit of luma sample) | ¼ | ½ | 1 | 2 | 4 | 8 | 16 | 32 |

In some example implementations of the MMVD, a direction index may be further signaled and used to represent a direction of the MVD relative to the reference motion vector. In some implementations, the direction may be restricted to either one of the horizontal and vertical directions. An example 2-bit direction index is shown in Table 2. In the example of Table 2, the interpretation of the MVD could be variant according to the information of the starting/reference MVs. For example, when the starting/reference MV corresponds to a uni-prediction block or corresponds to a bi-prediction block with both reference frame lists point to the same side of the current picture (i.e. POCs of the two reference pictures are both larger than the POC of the current picture, or are both smaller than the POC of the current picture), the sign in Table 2 may specify the sign (direction) of MV offset added to the starting/reference MV. When the starting/reference MV corresponds to a bi-prediction block with the two reference pictures at different sides of the current picture (i.e. the POC of one reference picture is larger than the POC of the current picture, and the POC of the other reference picture is smaller than the POC of the current picture), and a difference between the reference POC in picture reference list 0 and the current frame is greater than that between the reference POC in picture reference list 1 and the current frame, the sign in Table 2 may specify the sign of MV offset added to the reference MV corresponding to the reference picture in picture reference list 0, and the sign for the offset of the MV corresponding to the reference picture in picture reference list 1 may have an opposite value (opposite sign for the offset). Otherwise, if the difference between the reference POC in picture reference list 1 and the current frame is greater than that between the reference POC in picture reference list 0 and the current frame, the sign in Table 2 may then specify the sign of MV offset added to the reference MV associated with the picture reference list 1 and the sign for the offset to the reference MV associated with the picture reference list 0 has opposite value.

TABLE 2

| Example implementations for sign of MV offset specified by direction index | | | | |
|---|---|---|---|---|
| Direction IDX | 00 | 01 | 10 | 11 |
| x-axis (horizontal) | + | – | N/A | N/A |
| y-axis (vertical) | N/A | N/A | + | – |

In some example implementations, the MVD may be scaled according to the difference of POCs in each direction. If the differences of POCs in both lists are the same, no scaling is needed. Otherwise, if the difference of POC in reference list 0 is larger than the one of reference list 1, the MVD for reference list 1 is scaled. If the POC difference of reference list 1 is greater than list 0, the MVD for list 0 may be scaled in the same way. If the starting MV is uni-predicted, the MVD is added to the available or reference MV.

In some example implementations of MVD coding and signaling for bi-directional compound prediction, in addition or alternative to separately coding and signaling the two MVDs, a symmetric MVD coding may be implemented such that only one MVD needs signaling and the other MVD may be derived from the signaled MVD. In such implementations, motion information including reference picture indices of list-0 and list-1 are not both signaled. Specifically, at a slice level, a flag may be included in the bitstream, referred to as "mvd_l1_zero_flag," for indicating whether the reference list-1 is not signaled in the bitstream. If this flag is 1, indicating that reference list-1 is equal to zero (and thus not signaled), then a bi-directional-prediction flag, referred to as "BiDirPredFlag" may be set to 0, meaning that there is no bi-directional-prediction. Otherwise, if mvd_l1_zero_flag is zero, if the nearest reference picture in list-0 and the nearest reference picture in list-1 form a forward and backward pair of reference pictures or a backward and forward pair of reference pictures, BiDirPredFlag may be set to 1, and both list-0 and list-1 reference pictures are short-term reference pictures. Otherwise BiDirPredFlag is set to 0. BiDirPredFlag of 1 may indicate that a symmetrical mode flag is additionally signalled in the bitstream. The decoder may extract the symmetrical mode flag from the bitstream when BiDirPred-Flag is 1. The symmetrical mode flag, for example, may be signaled (if needed) at the CU level and it may indicate whether the symmetrical MVD coding mode is being used for the corresponding CU. When the symmetrical mode flag is 1, it indicates the use of the symmetrical MVD coding mode, and that only reference picture indices of both list-0 and list-1 (referred to as "mvp_l0_flag" and "mvp_l1_flag") are signaled with MVD associated with the list-0 (referred to as "MVD0"), and that the other motion vector difference, "MVD1", is to be derived rather than signaled. For example, MVD1 may be derived as –MVD0. As such, only one MVD is signaled in the example symmetrical MVD mode.

In some other example implementations for MV prediction, a harmonized scheme may be used to implement a general merge mode, MMVD, and some other types of MV prediction, for both single-reference mode and compound-reference mode MV prediction. Various syntax elements may be used to signal the manner in which the MV for a current block is predicted. For example, for single-reference mode, the following MV prediction modes may be signaled:

NEARMV—use one of the motion vector predictors (MVP) in the list indicated by a DRL (Dynamic Reference List) index NEWMV—use one of the motion vector predictors (MVP) in the list signaled by a DRL index as reference and apply a delta to the MVP.

GLOBALMV—use a motion vector based on frame-level global motion parameters

Likewise, for the compound-reference inter-prediction mode using two reference frames corresponding to two MVs to be predicted, the following MV prediction modes may be signaled:

NEAR_NEARMV—use one of the motion vector predictors (MVP) in the list signaled by a DRL index.

NEAR_NEWMV—use one of the motion vector predictors (MVP) in the list signaled by a DRL index as reference and send a delta MV for the second MV.

NEW_NEARMV—use one of the motion vector predictors (MVP) in the list signaled by a DRL index as reference and send a delta MV for the first MV.

NEW_NEWMV—use one of the motion vector predictors (MVP) in the list signaled by a DRL index as reference and send a delta MV for both MVs.

GLOBAL_GLOBALMV—use MVs from each reference based on their frame-level global motion parameters.

The term "NEAR" above refers to MV prediction using reference MV without MVD as a general merge mode, whereas the term "NEW" refers to MV prediction involving using a referend MV and offsetting it with a signaled motion vector difference (MVD) as in an MMVD mode. For the compound inter-prediction, both the reference base motion vectors and the motion vector deltas above, may be generally different or independent between the two references, even though they may be correlated and such correlation may be leveraged to reduce the amount of information needed for signaling the two motion vector deltas. In such situations, a joint signaling of the two MVDs may be implemented and indicated in the bitstream.

The dynamic reference list (DRL) above may be used to hold a set of indexed motion vectors that are dynamically maintained and are considered as candidate motion vector predictors.

Motion Vector Difference Coding

In some example implementations, in coding technologies such as AV1, fractional, such as ⅛ pixel (i.e., one eighth of a pixel) motion vector precision (or accuracy) is allowed/supported, and the following syntaxes are used to signal the motion vector difference in reference frame list 0 (L0) or list 1 (L1).

mv_joint specifies which components of the motion vector difference are non-zero 0 indicates there is no non-zero MVD along either horizontal or vertical direction 1 indicates there is non-zero MVD only along horizontal direction 2 indicates there is non-zero MVD only along vertical direction 3 indicates there is non-zero MVD along both horizontal and vertical direction mv_sign specifies whether motion vector difference is positive or negative mv_class specifies the class of the motion vector difference. As shown in Table 3, a higher class means that the motion vector difference has a larger magnitude.

TABLE 3

| Magnitude class for motion vector difference | |
| --- | --- |
| MV class | Magnitude of MVD |
| MV_CLASS_0 | (0, 2] |
| MV_CLASS_1 | (2, 4] |
| MV_CLASS_2 | (4, 8] |
| MV_CLASS_3 | (8, 16] |
| MV_CLASS_4 | (16, 32] |
| MV_CLASS_5 | (32, 64] |
| MV_CLASS_6 | (64, 128] |
| MV_CLASS_7 | (128, 256] |
| MV_CLASS_8 | (256, 512] |
| MV_CLASS_9 | (512, 1024] |
| MV_CLASS_10 | (1024, 2048] | mv_bit specifies the integer part of the offset between motion vector difference and starting magnitude of each MV class mv_fr specifies the first 2 fractional bits of the motion vector difference mv_hp specifies the third fractional bit of the motion vector difference Adaptive MVD Resolution In some example implementations, resolution for MVD in various MVD magnitude classes may be differentiated. For example, high resolution MVD for large MVD magnitude of higher MVD classes may not provide statistically significant improvement in compression efficiency. As such, the MVDs may be coded with decreasing resolution (integer pixel resolution or fractional pixel resolution) for larger MVD magnitude ranges, which correspond to higher MVD magnitude classes. Likewise, the MVD may be coded with decreasing resolution (integer pixel resolution or fractional pixel resolution) for larger MVD values in general. Such MVD class-dependent or MVD magnitude-dependent MVD resolution may be generally referred to as adaptive MVD resolution.

Using adaptive MVD resolution, the reduction of number of signaling bits by aiming at less precise MVD may be greater than the additional bits needed for coding inter-prediction residual as a result of such less precise MVD, due to the statistical observation that treating MVD resolution for large-magnitude or high-class MVD at similar level as that for low-magnitude or low-class MVD in a non-adapted manner may not significantly increase inter-prediction residual coding efficiency for bocks with large-magnitude or high-class MVD. In other words, using higher MVD resolutions for large-magnitudes or high-class MVD may not produce much coding gain over using lower MVD resolutions.

In some example implementations, further constraints may be imposed to the compound reference modes, such as the NEW_NEARMV and NEAR_NEWMV modes as described above. Specifically, the precision of the motion vector difference (MVD) depends on the associated class and the magnitude of MVD.

In some example implementations, fractional MVD is allowed only if MVD magnitude is equal to or less than one-pixel. Alternatively or additionally, in some example implementations, only one MVD value is allowed when the value of the associated MV class is equal to or greater than MV_CLASS_1, and the MVD value in each MV class is derived as 4, 8, 16, 32, 64 for MV class 1 (MV_CLASS_1), 2 (MV_CLASS_2), 3 (MV_CLASS_3), 4 (MV_CLASS_4), or 5 (MV_CLASS_5), respectively.

Exemplarily, the allowed MVD values in each MV class are illustrated in Table 4.

TABLE 4

| Adaptive MVD in Each MV Magnitude Class | |
| --- | --- |
| MV class | Magnitude of MVD |
| MV_CLASS_0 | (0, 1], {2} |
| MV_CLASS_1 | {4} |
| MV_CLASS_2 | {8} |
| MV_CLASS_3 | {16} |
| MV_CLASS_4 | {32} |
| MV_CLASS_5 | {64} |
| MV_CLASS_6 | {128} |
| MV_CLASS_7 | {256} |
| MV_CLASS_8 | {512} |
| MV_CLASS_9 | {1024} |
| MV_CLASS_10 | {2048} |

In addition, if current block is coded as NEW_NEARMV or NEAR_NEWMV mode, one context is used for signaling mv_joint or mv_class. Otherwise, another different context is used for signaling mv_joint or mv_class. Note that in AV1, mv_class specifies the class of the motion vector difference. A higher class means that the motion vector difference represents a larger update; mv_joint specifies which components of the motion vector difference are non-zero.

Improvement for Adaptive MVD Resolution

In some example implementations, further improvement may be implemented for adaptive MVD. A new inter coded mode, named as AMVDMV, may be added to single reference case. When AMVDMV mode is selected and/or flagged, it indicates that AMVD is applied to signal MVD, such that adaptive MVD resolution is employed.

In one solution, one flag, named as amvd_flag, is added under JOINT_NEWMV mode to indicate whether AMVD is applied to joint MVD coding mode or not. When adaptive MVD resolution is applied to joint MVD coding mode, which may also be named as joint AMVD coding mode, MVD for two reference frames are jointly signaled and the precision of MVD is implicitly determined by, for example, MVD magnitudes. Otherwise, MVD for two (or more than two) reference frames are jointly signaled, and conventional MVD coding is applied.

Alternatively, MVD for two (or more than two) reference frames may be jointly signaled, and conventional MVD coding is applied. In this case, rather than adding the amvd_flag as discussed above, one new inter prediction mode, named as JOINT_AMVDNEWMV is added to indicate that AMVD is applied to joint MVD coding mode.

Adaptive Motion Vector Resolution (AMVR)

In some example implementations, AMVR may be implemented in various coding technologies, such as AV1. For example, a total of 7 MV precisions (e.g., 8, 4, 2, 1, ½, ¼, ⅛) are supported. For each prediction block, an encoder (e.g., an AVM, AV1 encoder) searches all the supported precision values and signals the best precision to the decoder.

To reduce the encoder run-time complexity, two precision sets are supported. Each precision set may contain, for example, 4-predefined precisions. One of the precision set is adaptively selected at the frame level based on the value of maximum precision of the frame. Exemplarily, maximum precision may be signaled in the frame header. Table 5 summarizes the supported precision values based on the frame level maximum precision.

TABLE 5

Supported MV precisions in two sets

| Frame level maximum precision | Supported MV precisions |
|---|---|
| ⅛ | ⅛, ½, 1, 4 |
| ¼ | ¼, 1, 4, 8 |

In some example implementations, there is a frame level flag to indicate if the MVs of the frame contains sub-pel (i.e., sub-pixel) precisions or not. The AMVR is enabled only if the value of cur_frame_force_integer_mv flag is 0. Under AMVR, if precision of the block is lower than the maximum precision, motion model and interpolation filters are not signaled. If the precision of a block is lower than the maximum precision, motion mode may be inferred to translation motion and interpolation filter is inferred to REGULAR interpolation filter. Similarly, if the precision of the block is either 4-pel or 8-pel, inter-intra mode is not signaled and inferred to be 0.

Joint MVD Coding (JMVD)

In some example implementations, in coding technologies such as AV1, an inter coded mode, named as JOINT_NEWMV, is applied to indicate whether the MVDs for two reference lists are jointly signaled. If the inter prediction mode is equal to JOINT_NEWMV mode, MVDs for reference list 0 and reference list 1 are jointly signaled. In this case, only one MVD, named as joint_mvd, is signaled and transmitted to the decoder, and the delta MVs for reference list 0 and reference list 1 are derived from joint_mvd.

In some example implementations, JOINT_NEWMV mode is signaled together with NEAR_NEARMV, NEAR_NEWMV, NEW_NEARMV, NEW_NEWMV, and GLOBAL_GLOBALMV mode. No additional contexts need to be added.

When JOINT_NEWMV mode is signaled, and the Picture Order Count (POC) distance between two reference frames and current frame is different, MVD is scaled for reference list 0 or reference list 1 based on the POC distance. To be specific, the distance between reference frame list 0 and current frame is noted as td0, and the distance between reference frame list 1 and current frame is noted as td1. If td0 is equal to or larger than td1, joint_mvd is the jointly signaled MVD and is directly used for reference list 0, and the mvd for reference list 1 is derived from joint_mvd based on the equation (1):

$$derived\_mvd = \frac{td1}{td0} * joint\_mvd \qquad (1)$$

Otherwise, if td1 is equal to or larger than td0, joint_mvd is directly used for reference list 1 and the mvd for reference list 0 is derived from joint_mvd based on the equation (2):

$$derived_{mvd} = \frac{td0}{td1} * joint_{mvd} \qquad (2)$$

Improved Joint MVD Coding

In some example implementations, in coding technologies such as AV1, if one block is coded as joint MVD coding mode, for example, JOINT_NEWMV or JOINT_AMVD-NEWMV, a new syntax, named as mvd_scaling_factor_idx, is signaled into the bitstream to explicitly indicate the scaling factor for MVD between reference frame 0 and reference frame 1.

Exemplarily, as shown in Table 6 and Table 7, two pre-defined look-up tables may be used to store the supported/allowed scaling factors for JOINT_NEWMV or JOINT_AMVDNEWMV, separately. The associated entry index for the selected scaling factor in the look-up table is signaled in the bitstream. For JOINT_AMVDNEWMV mode, same scaling factors are applied to both vertical and horizontal components of the MVD for reference frame list 0 and/or 1. For JOINT_NEWMV mode, the scaling factor for one component (either vertical component or horizontal component) of MVD is restricted to be 1, and the scaling factor for the other component of MVD can be other values, such as 2 or ½. In one example, the MVD for reference frame list 0 and 1 is calculated in the following equations:

$$mvd\_ref0 = joint\_mvd \qquad (3)$$

$$mvd\_ref1 = joint\_mvd * \frac{td1}{td0} * jmvd\_scale \qquad (4)$$

Here, mvd_ref0 and mvd_ref1 denote the MVD for reference frame list 1 and MVD for reference frame list 2, respectively. The distance between reference frame list 0 and current frame is noted as td0, and the distance between reference frame list 1 and current frame is noted as td1; joint_mvd denotes the jointly signaled MVD; and jmvd_scale denotes the scaling factor.

TABLE 6 scaling factors for JOINT_AMVDNEWMV

| Index | Scaling factors for both x and y axes |
|---|---|
| 0 | 1 |
| 1 | 2 |
| 2 | ½ |

19

TABLE 7

| scaling factors for JOINT_NEWMV | | |
|---|---|---|
| Index | Scaling factor for x-axis | Scaling factor for y-axis |
| 0 | 1 | 1 |
| 1 | 1 | 2 |
| 2 | 2 | 1 |
| 3 | 1 | ½ |
| 4 | ½ | 1 |

Bi-Prediction with CU-Level Weight (BCW)

In some example implementations, in video coding technologies such as HEVC, the bi-prediction signal is generated by averaging two prediction signals obtained from two different reference pictures and/or using two different motion vectors. In VVC, the bi-prediction mode is extended beyond simple averaging to allow weighted averaging of the two prediction signals. For example, the prediction using bi-direction denoted as $P_{bi\text{-}pred}$ may be calculated by using equation 5 below:

$$P_{bi-pred} = ((8 - w) * P_0 + w * P_1 + 4) \gg 3 \tag{5}$$

Exemplarily, five weights are allowed in the weighted averaging bi-prediction, $w \in \{-2, 3, 4, 5, 10\}$. When w is equal to 4, equal weighting factor is used to do the weighted average of two prediction samples. For each bi-predicted CU, the weight w is determined in one of two ways: 1) for a non-merge CU, the weight index is signaled after the motion vector difference; 2) for a merge CU, the weight index is inferred from neighboring blocks based on the merge candidate index.

In some example implementations, BCW is only applied to CUs with 256 or more luma samples (i.e., CU width times CU height is greater than or equal to 256). For low-delay pictures, all 5 weights are used. For non-low-delay pictures, only 3 weights ($w \in \{3,4,5\}$) are used.

Local Illumination Compensation (LIC)

LIC is a video coding tool that video encoder and video decoder can utilize. In some example implementations, LIC may be applied based on a linear model for compensating illumination changes (e.g., at the motion compensation stage) between one or more temporal reference pictures and a current picture. The linear model is based on LIC parameters including a scaling factor $\alpha$ and an offset $\beta$, and is described in more details below under the Block Adaptive Weighted Prediction section below. LIC can be enabled or disabled via, for example, high level signaling at various levels.

In some example implementations, bi-prediction reference template may be generated for template samples associated with a current block. Reference template samples may be identified based on one or more motion vectors associated with the current block. For example, the reference template samples may include neighbor temporal reference CUs of the current CU and may correspond to template samples for the current CU. The reference template samples may be jointly considered (e.g., averaged) in LIC parameter derivation.

In some example implementations, least mean-squared-error (LMSE) algorithm may be applied to derive LIC parameters. For example, the LMSE-based computation may be performed to determine the LIC parameters such that the differences between the bi-predicted reference template reference samples and the template samples for the current CU may be minimized.

In some example implementations, similar approach may be used under uni-prediction. In this case, the LIC parameters may be determined such that the differences between the uni-predicted reference template reference samples and the template samples for the current CU may be minimized.

Note that the LMSE algorithm is described herein is merely an example of deriving LIC parameters. One or more other approaches/algorithms may be used.

Block Adaptive Weighted Prediction (BAWP)

In some example implementations, BAWP is employed to model local illumination variation.

Figure 12:
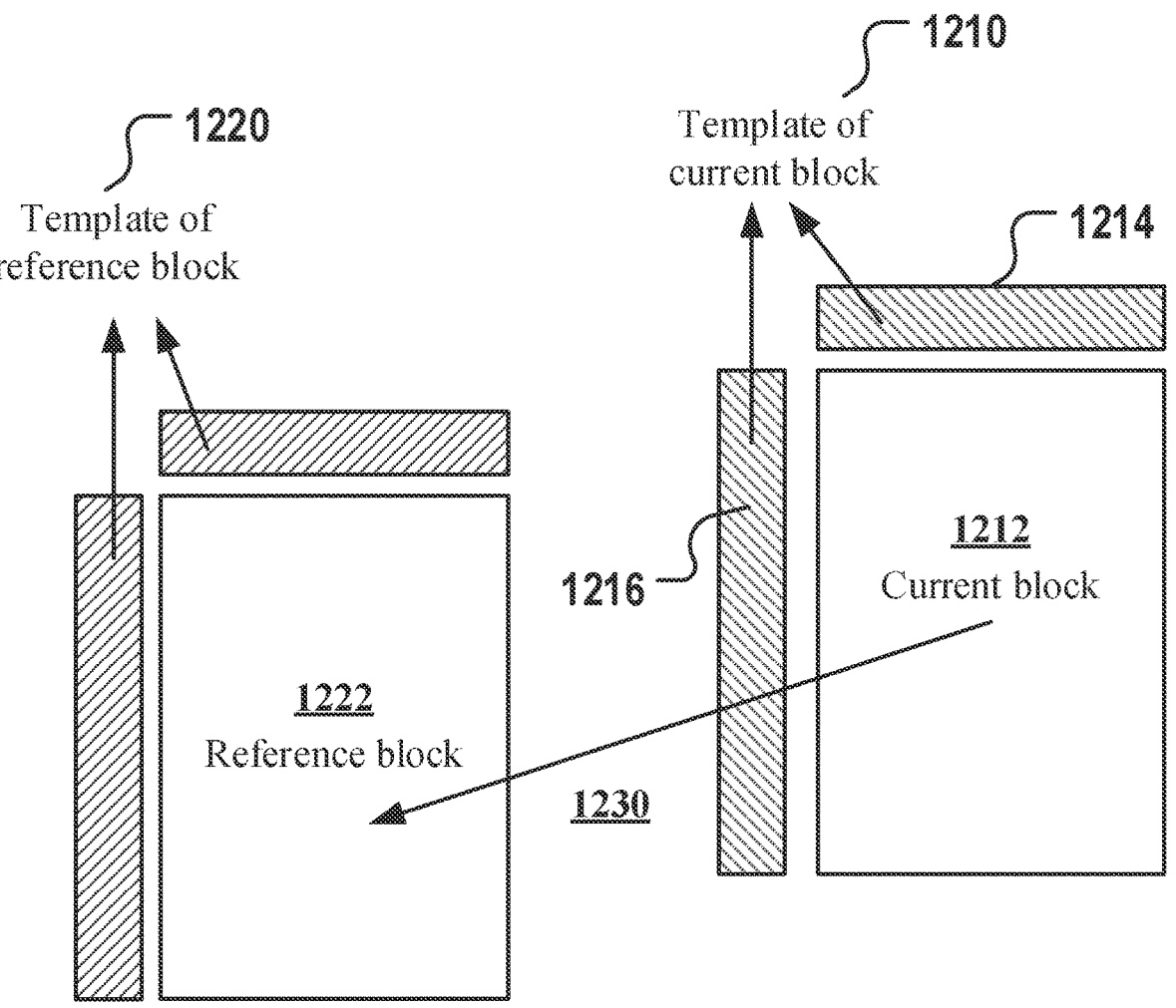
FIG. 12 shows an example of template of a current block and template of a reference block.

Referring to FIG. 12, for example, BAWP may be a block-level weighted prediction to model local illumination variation between current block and its prediction block as a function of that between current block template (or the causal samples of current block) and reference block template. The template (or referred as current template, 1210) of the current block (1212) and the template (or referred as reference template, 1220) of the reference block (1222) are illustrated in FIG. 12. The reference block may be indicated or determined by a motion vector (MV, 1230). The current block may be in a current picture (or current frame), and the reference block may be in a reference picture (or reference frame). In some implementations, the function may be a linear function. The parameters of the function may be denoted by a scale factor $\alpha$ and an offset $\beta$, which forms a linear equation. The scale factor may also be referred to as scale, alpha factor, or alpha value.

When a block is coded in BAWP mode, an exemplary linear function used to compensate illumination changes is listed below:

$$p'(x') = \alpha * p(x) + \beta$$

Where: p'(x') is a predict sample at location x' in the current block (or a predict sample in a prediction unit (PU) in the current block), p(x) is a sample corresponding to p'(x') at location x in the reference block, $\alpha$ is the scale factor (or scale), and $\beta$ is an offset value. Note that the reference block may be identified or derived from the MV associated with the current block, and p(x) is a reference sample pointed to by the MV at a location x on reference picture. Note that in equation 6, reference sample and predict sample may have same coordinate (i, j) in their respective block (i.e., reference block and current block, or reference block and prediction unit). Alternatively, the coordinate for the reference sample in the reference block may be based on the coordinate for the predict sample in the current block. For example, the coordinate for the predict sample may be adjusted by a delta value, to obtain the coordinate (in the reference picture) for the corresponding reference sample. In some example implementations, p'(x') and p(x) may be referred as collocated—with p(x) being the reference sample at location x in the reference block corresponding to p'(x') at location x' in the current block. In some example implementations, the correspondence between p'(x') and p(x) may be established by motion information, such as motion vector(s).

In some example implementations, $\alpha$ and $\beta$ may be derived based on current block template and reference block template, and therefore no signaling overhead is required for them, except that an BAWP flag (e.g., bawp_flag) is signaled for single inter prediction mode to indicate the use of BAWP.

In some example implementations, the BAWP method is only applied to blocks with size larger than or equal to 8×8 and coded in single inter prediction mode. In some example implementations, the BAWP method is only applied to the luma component.

While deriving both the scale factor and offset ($\alpha$ and $\beta$) will save some signaling overhead, there may be some potential drawbacks during certain scenarios. For example, the effectiveness and/or accuracy of the scaling factors depends on the similarity between the current block and its template in the reference frame. When the correlation between the current block and its template in the reference frame is high, the derived scaling factors can significantly improve prediction accuracy. However, if the current block and its template in the reference frame are significantly different, the scaling factors may be inaccurate and even un-useful, and the prediction accuracy may suffer.

In this disclosure, various embodiments are disclosed for improving video encoding/decoding technologies under BAWP and/or LIC mode, aiming to enhance prediction accuracy with minimum overhead on signaling cost. Specifically, various methods are described for signaling and/or deriving the scale factor and offset ($\alpha$ and $\beta$) as specified in equation 6. Further, to increase the support parameter range, adaptive precision for scale factor and/or offset is employed.

In this disclosure, the term block may refer to a transform block, a coded block, a prediction block, a coding block, a coding unit (CU), etc. The term chroma block may refer to a block in any of the chrominance (color) channels. The direction of a reference frame is determined by whether the reference frame is prior to current frame in display order or after current frame in display order.

In this disclosure, a sample may be interpreted as pixel value of a pixel. It may generally refer to any component (luma, or chroma).

In this disclosure, the term x-axis and y-axis refers to the horizontal and vertical component of a 2-D value. They may also be replaced by another two axes along two pre-defined directions that are perpendicular to each other, and the same embodiments also apply. That is, x-axis and y-axis may be rotated by a degree. For example, x-axis and y-axis may be replaced by 45-degree axis and 135-degree axis.

In this disclosure, a conventional JMVD may refer to JMVD with regular full MV resolution, or JMVD with AMVR.

For embodiments described below, a coding block or a coded block may be coded in BAWP (or LIC, or compound weighted prediction (CWP)) mode, hereinafter referring as BAWP to simplify description. In some examples, an BAWP flag (e.g., bawp_flag) is signaled in a video bitstream to indicate whether BAWP mode is used for a current block. Based on the value of the BAWP flag (e.g., bawp_flag) being equal to 1, a scale factor and/or an offset is further signaled in the video bitstream to indicate a degree of illumination changes for the current block.

In one embodiment, when current block is predicted from its reference block using a linear function with a scale factor and an offset $\beta$, such as the linear equation 6 shown above, the selection of scale factor and/or offset $\beta$ may be signaled into the bitstream and parsed at the decoder side to reconstruct the predicted block. The reference block may be specified by, for example, the motion vector associated with the current block. That is, scale factor and/or offset $\beta$ may be explicitly signaled, rather than derived by the decoder. In some example implementations, only scale factor is signaled, and offset $\beta$ may be derive based on the scale factor, or vice versa. In this disclosure, scale factor may also be referred to as scale, scale factor, scale factor $\alpha$, or alpha factor.

Based on investigation and statistical observation, treating (coding, signaling) large-magnitude scale factor values at similar or same precision level as that for low-magnitude scale factor values in a non-adapted manner may not significantly increase prediction accuracy and efficiency. In other words, using same precision for large-magnitudes scale factor value may not produce much coding gain over using lower precision.

In one embodiment, rather than using a uniform precision, the signaled precision for scale factor $\alpha$ may depend on the magnitude of scale factor.

In one embodiment, the signaled precision for scale factor may decrease as the magnitude (or the absolute value of the magnitude) of scale factor increases. The precision may be represented by a step size between two adjacent scale factors.

As an example, a list for supported scale factors may be: {1.0, 1.2, 1.6, 2.2, 3.0, 4.0}. The step sized between two adjacent scale factors are 0.2, 0.4, 0.6, 0.8, 1.0, and the precisions are decreasing. As another alternative example, the step size may be the same for a first scale factor range, and may increase for a second scale factor range, if the second scale factor range covers scale factors with larger value, or larger absolute value.

In one embodiment, to further increase coding (e.g., entropy coding) gain and efficiency, as well as to reduce signaling overhead, the supported range for scale factor may be divided into multiple groups. Each group may be assigned with a different precision following various manners. For example, the precision of the signaled scale values may decrease as the group index increases. The group index and value of scale factor within each group are signaled into the bitstream and parsed at the decoder side. The group index may be used to identify the group, and another index may be used to identify the particular scale factor in the group. The group may be implemented as a lookup table, a list, a set, and the like. The precision of the signaled scale value follows the precision of the group to which the scale value belongs.

In this disclosure, the term "list" for storing scale values may be used interchangeably with the term "lookup table". The list and the lookup table may both support sorting function and may both be sorted based on certain sorting rules which are discussed below.

In some example implementations, as shown in the table 8 below, the supported scale factor range is divided into 4 groups. The second column of the table lists the range (or the range for the absolute value of the scale factor) for each group, while the third column lists the step size (or precision) of the signaled values within each group. In the table, a parenthesis, "(" or ")", indicates the endpoint value is not included (exclusive). A bracket, "[" or "]", indicates that an endpoint value is included (inclusive).

TABLE 8

| | Scale Factor Groups with Different Precisions | |
|---|---|---|
| Group Index | Range (for scale factor) | Step size (or Precision) |
| 0 | [0, 2] | $\frac{1}{8}$ |
| 1 | (2, 4] | 1 |
| 2 | (4, 8] | 2 |
| 3 | (8, 16] | 4 |

In one embodiment, the precision for signaled scale factor may decrease as the absolute difference between the magnitude of scale factor and a threshold value (TH) increases. The absolute difference is noted as Diff and represents a distance from the scale and the threshold. In some example implementations, TH may be set or preconfigured to 1.

An example is shown in table 9 below. The first column of the table lists the range of Diff for each group, while the second column lists the precision of the signaled scape factor values within each group.

TABLE 9

| Diff Ranges and Corresponding Step Sizes | |
| --- | --- |
| Range of Diff, (delta value) | Step size (or Precision) |
| [0, 2] | ⅛ |
| (2, 4] | 1 |
| (4, 8] | 2 |
| (8, 16] | 4 |

For example, when TH is set to 1, if scale factor calculated by encoder is 1.2, then the Diff is 0.2 and the signaled scale factor will be assigned a step size of ⅛; if scale factor calculated by encoder is 5.3, then the Diff is 4.3 and the signaled scale factor will be assigned a step size of 2.

Alternatively, in one embodiment, to reduce encoder/decoder complexity, a uniform scale factor precision may be used. That is, a fixed precision may be used for all the supported values of scale factor.

In one embodiment, all the supported values for scale factor are re-ordered based on the absolute difference (or distance) between the magnitude of scale factor and the threshold TH. Multiple threshold values may be supported by the encoder and/or decoder, and the TH used for sorting the scale value may be updated dynamically, for example, via signaling or syntax element. Selecting and dynamically updating the TH may help to improve the efficiency of entropy encoding. With each TH value update, the decoder may re-sort (re-order) the supported scale values based on the updated TH. Therefore, the decoder maintains an ordered data structure (e.g., ordered list, ordered lookup table) for storing the scale factors. If multiple lookup tables are used, during the re-sorting process, scale factors may be shuffled to a different lookup table (e.g., with different table index).

In one embodiment, the index of selected scale factor for current block in the re-ordered scale factor list ((e.g., lookup table) is directly signaled into the bitstream and parsed at the decoder side.

In one embodiment, the re-ordered scale list may be divided into multiple groups (e.g., multiple lookup tables). The group index of a target group comprising the selected scale factor to be used for the current block, along with the index identifying the selected scale factor in the target group, is signaled into the bitstream and parsed at the decoder side. For example, a re-ordered scale factor list contains 16 scale factors, which may be divided into 4 groups (sub-lists), each group may contain 4 scale factors and may be assigned with a group index. The usage of the re-ordered scale list is just for example purpose for an example implementation. In some other implementations, the decoder may not need to use the re-ordered scale factor list, and may directly maintain the multiple groups.

Note that in this disclosure, unless otherwise specified, a signaling may include one or more sub-signalings. The one or more sub-signalings may be transmitted together, or separately. In the above example, the group index identifying the target group and the index identifying the selected scale factor in the target group may be signaled together in one signaling, or they may be signaled via two sub-signalings, which may be signaled separately. Signaling in this disclosure may be carried via, for example, syntax element.

In one embodiment, the value of TH is signaled at the high-level syntax (or syntax element), which includes at least one of: a sequence level syntax; a frame level syntax; or a slice level syntax.

In one embodiment, rather than signaling the scale factor value, a scale factor difference (delta scale factor), which is a difference between a scale factor predictor and the scale factor, may be signaled into the bitstream and parsed at the decoder side. The decoder may first derive or predict a predicted scale factor, to obtain the scale factor predictor, then apply the delta scale factor to the scale factor predictor, to derive the final scale factor.

In some example implementations, the decoder may derive the scale factor predictor based on local illumination variation between current block template 1210 (or the causal samples of current block) and reference block template 1220, and the delta scale factor is signaled into the bitstream and parsed at the decoder side.

In one embodiment, the decoder may maintain an ordered list for all the supported scale values. The sorting or the re-ordering may be based on the absolute difference between the magnitude of scale factor and the scale factor predictor as described above.

In one embodiment, the index of selected scale factor for current block in the re-ordered scale list is directly signaled into the bitstream and parsed at the decoder side.

In one embodiment, the re-ordered scale list may be divided into multiple groups, and the group index of the selected scale factor for current block, along with the index within each group, is signaled into the bitstream and parsed at the decoder side.

In one embodiment, left or above (top) causal samples of the current block and/or reference block) may be used to derive the predicted scale factor.

In some example implementations, if the width is greater than height for current block, only the above causal samples (for current block and/or reference block), such as 1214 in FIG. 12, are used to derive the predicted scale factor.

In some example implementations, if the height is greater than width for current block, only the left causal samples (of current block and/or reference block), such as 1216 in FIG. 12, may be used to derive the predicted scale factor.

In some example implementations, the bottom left and/or above right samples (of current block and/or reference block) may be used to derive the predicted scale factor.

In one embodiment, the minimum supported value for scale factor $\alpha$ is greater than zero.

In one embodiment, the offset values $\beta$ may be derived as the average value of the template of current block.

In one example, if the width is greater than height for current block, only the above causal samples (of current block and/or reference block), such as 1214 in FIG. 12, may be used to derive the offset values $\beta$.

In one example, if the height is greater than width for current block, only the left causal samples (of current block and/or reference block), such as 1216 in FIG. 12, may be used to derive the offset values $\beta$.

In one embodiment, the offset values $\beta$ may be derived as the average value of the reference block (or the template of reference block).

In one embodiment, the offset values $\beta$ may be derived as the difference between the template of current block and the template of the reference block. Exemplarily, when calculating the difference, average of each template may be used.

In one embodiment, one flag is signaled in the bitstream and parsed from the bitstream to indicate whether the explicit signal of scale factor and/or offset $\beta$ is selected for current block. In some example implementations, this flag is signal for BAWP/LIC/CWP mode. In some example implementations, this flag is only signaled under BAWP mode; or this flag is only signaled under LIC mode, or this flag is only signaled under CWP mode. Note that the explicit signal may include the real values, or index(s) for looking up real values from lookup table(s).

In one embodiment, when the flag indicates an explicit signaling applies, the scale factor is explicitly signaled and the offset $\beta$ is set as 0 (so there is no need to access neighboring samples) or average of template (which needs to access the neighboring samples).

In one embodiment, one high level syntax is signaled to indicate whether the explicit signaling of scale factor and/or offset $\beta$ is supported or not. The syntax may be signaled via at least one of following levels: a sequence level; a frame level; a slice level; or a super block level.

In one embodiment, the scale factor and the offset values $\beta$ may be signaled jointly.

In one embodiment, a group of combinations of $\alpha$ and $\beta$ may be pre-defined or implicitly derived for each block, and the index indicating the selected combination of ($\alpha$ and $\beta$) is signaled. For example, the group may be" $\{(1.1, 0.2), (1.6, 0.1), (2.3, 0.3)\}$, with each pair in the parenthesis forms a combination of $\alpha$ and $\beta$.

In one embodiment, a group of predicted combinations of $\alpha$ and $\beta$ are pre-defined or implicitly derived for each block, and the difference between the selected combination of $\alpha$ and $\beta$ and the predicted combination of $\alpha$ and $\beta$ is signaled.

In this disclosure, a signaling (e.g., syntax element) may indicate a value, such as the scale factor, and/or the offset $\beta$, in an explicit way or an implicit way. The explicit indication may be conducted by sending an index to a lookup table to lookup a value, or by sending the value directly. When a value is sent in the implicit way, the decoder may need to do further derivation based on the signal syntax element. In the implicit indication case, the syntax element may also be referred as "associating with" the to be derived value.

Various embodiments and/or implementations described in the present disclosure may be performed separately or combined in any order. Further, each of the methods (or embodiments), encoder, and decoder may be implemented by processing circuitry (e.g., one or more processors or one or more integrated circuits). The one or more processors execute a program that is stored in a non-transitory computer-readable medium. In the present disclosure, the term block may be interpreted as a prediction block, a coding block, or a coding unit (CU).

FIG. 13 shows a flow chart 1300 of an exemplary method following the principles underlying the implementations above for indicating scale factor and/or offset value. The exemplary decoding method flow may include a portion or all of the following steps: S1310, receiving a video bitstream comprising a current block and a reference block, the reference block being used for predicting the current block and being identified by a motion vector associated with the current block; S1320, receiving, from the video bitstream, a syntax element indicating a scale factor ($\alpha$); S1330, determining the scale factor ($\alpha$) based on a value of the syntax element; S1340, predicting the current block using an equation as following: $p'(x')=\alpha*p(x)+\beta$, where: $p'(x')$ is a predicted sample in the current block, $p(x)$ is a collocated reference sample in the reference block corresponding to $p'(x')$, $\alpha$ is the determined scale factor based on the value of the syntax element, and $\beta$ is an offset; and S1350, reconstructing the current block based on the predicted current block.

In some example implementations, the current block may be in a current frame, and the reference block may be in a reference frame.

In some example implementations, alternatively, S1320 may include: receiving, from the video bitstream, a syntax element indicating or associating with a scale factor ($\alpha$) serving as a slope of a linear equation (e.g., $(x')=\alpha*p(x)+\beta$).

In the present disclosure, a direction of a reference frame may be determined by whether the reference frame is prior to current frame in display order or after current frame in display order.

Operations above may be combined or arranged in any amount or order, as desired. Two or more of the steps and/or operations may be performed in parallel. Embodiments and implementations in the disclosure may be used separately or combined in any order. Steps in one embodiment/method may be split to form multiple sub-methods, each of the sub-methods may be independent of other steps in the embodiment and may form a standalone solution. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium. Embodiments in the disclosure may be applied to a luma block or a chroma block. The term block may be interpreted as a prediction block, a coding block, or a coding unit, i.e. CU. The term block here may also be used to refer to the transform block. In the following items, when saying block size, it may refer to either the block width or height, or maximum value of width and height, or minimum of width and height, or area size (width*height), or aspect ratio (width:height, or height:width) of the block.

The techniques described above, can be implemented as computer software using computer-readable instructions and physically stored in one or more computer-readable media. For example, FIG. 14 shows a computer system (1800) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 14:
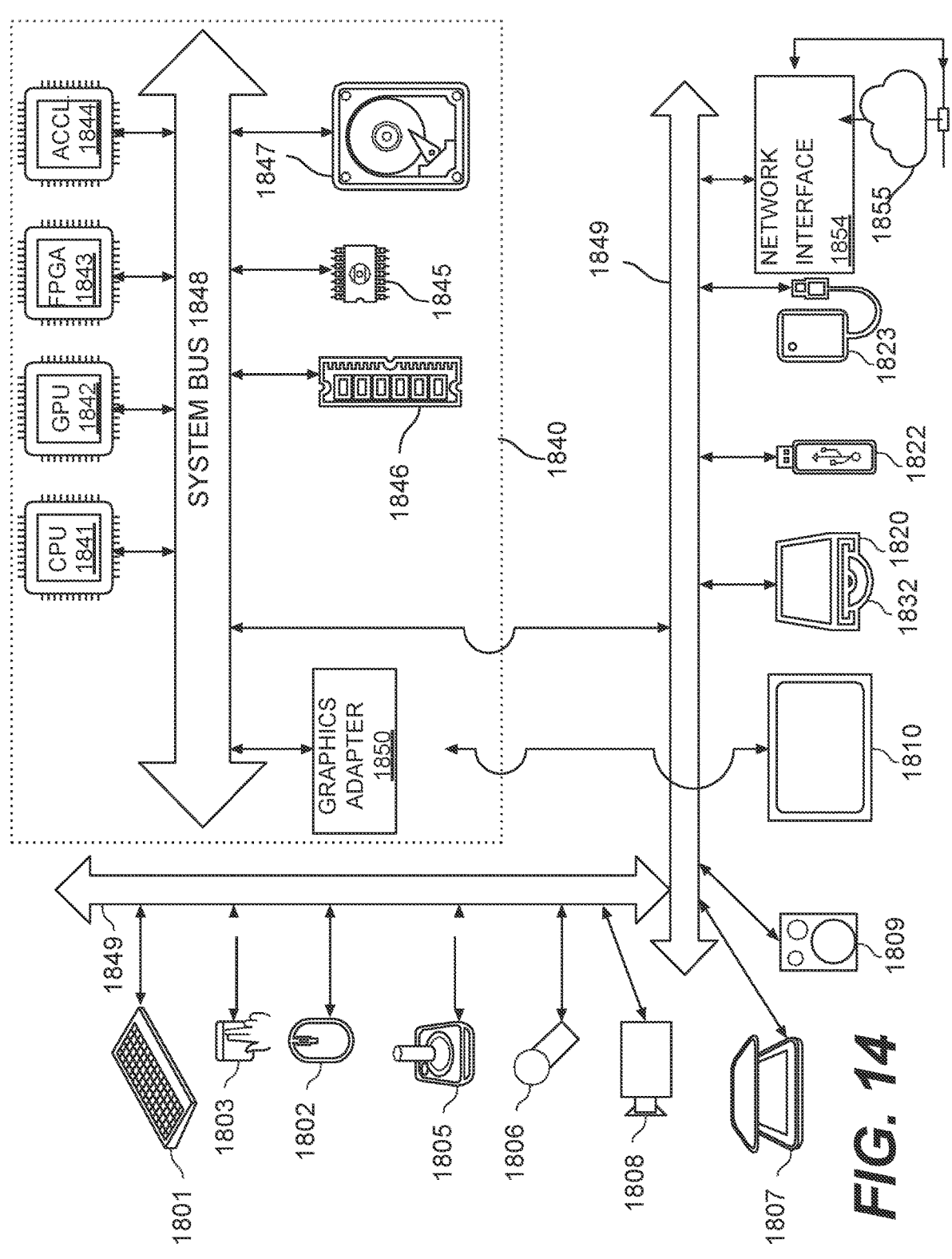
FIG. 14 shows a schematic illustration of a computer system in accordance with example embodiments of this disclosure.

The components shown in FIG. 14 for computer system (1800) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1800).

Computer system (1800) may include certain human interface input devices. Input human interface devices may include one or more of (only one of each depicted): keyboard (1801), mouse (1802), trackpad (1803), touch screen (1810), data-glove (not shown), joystick (1805), microphone (1806), scanner (1807), camera (1808).

Computer system (1800) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1810), data-glove (not shown), or joystick (1805), but there can also be tactile feedback devices that do not serve as input devices), audio output devices (such as: speakers (1809), headphones (not depicted)), visual output devices (such as screens (1810) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1800) can also include human accessible storage devices and their associated media such as optical media including CD/DVD ROM/RW (1820) with CD/DVD or the like media (1821), thumb-drive (1822), removable hard drive or solid state drive (1823), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1800) can also include an interface (1854) to one or more communication networks (1855). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CAN bus, and so forth.

Aforementioned human interface devices, human-accessible storage devices, and network interfaces can be attached to a core (1840) of the computer system (1800).

The core (1840) can include one or more Central Processing Units (CPU) (1841), Graphics Processing Units (GPU) (1842), specialized programmable processing units in the form of Field Programmable Gate Areas (FPGA) (1843), hardware accelerators for certain tasks (1844), graphics adapters (1850), and so forth. These devices, along with Read-only memory (ROM) (1845), Random-access memory (1846), internal mass storage such as internal non-user accessible hard drives, SSDs, and the like (1847), may be connected through a system bus (1848). In some computer systems, the system bus (1848) can be accessible in the form of one or more physical plugs to enable extensions by additional CPUs, GPU, and the like. The peripheral devices can be attached either directly to the core's system bus (1848), or through a peripheral bus (1849). In an example, the screen (1810) can be connected to the graphics adapter (1850). Architectures for a peripheral bus include PCI, USB, and the like.

The computer readable media can have computer code thereon for performing various computer-implemented operations. The media and computer code can be those specially designed and constructed for the purposes of the present disclosure, or they can be of the kind well known and available to those having skill in the computer software arts.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for processing video data in a decoder, the method comprising:

receiving a video bitstream comprising a current block in a current frame and a reference block in a reference frame, the reference block being used for predicting the current block and being identified by a motion vector associated with the current block;

receiving, from the video bitstream, a syntax element indicating a scale factor ($\alpha$);

determining the scale factor ($\alpha$) based on a value of the syntax element, wherein the scale factor ($\alpha$) is used for predicting the current block;

predicting the current block using an equation as following:

$$p'(x') = \alpha * p(x) + \beta$$

wherein: p'(x') is a predicted sample in the current block, p(x) is a collocated reference sample in the reference block corresponding to p'(x'), a correspondence between p'(x') and p(x) is established by the motion vector, $\alpha$ is the determined scale factor based on the value of the syntax element, and $\beta$ is an offset; and reconstructing the current block based on the predicted current block.

2. The method of claim 1, wherein the decoder maintains a lookup table for storing candidate scale factors, and the signaling carries an index identifying the scale factor in the lookup table.

3. The method of claim 2, wherein the candidate scale factors in the lookup table are sorted based on a difference between each of the candidate scale factors and a threshold value.

4. The method of claim 1, wherein:

the decoder maintains two or more lookup tables for storing candidate scale factors;

each of the two or more lookup tables supports a different scale factor range; and the signaling carries a first index identifying a target lookup table among the two or more lookup tables, and a second index identifying the scale factor in the target lookup table.

5. The method of claim 4, wherein the candidate scale factors in the each of the two or more lookup tables are sorted based on a difference between each of the candidate scale factors and a threshold value.

6. The method of claim 5, wherein the threshold value equals to 1.

7. The method of claim 5, further comprising:

receiving, from the video bitstream, a high level syntax indicating the threshold value, the high level syntax being signaled in at least one of following levels:

a sequence level;

a frame level; or a slice level.

8. The method of claim 5, further comprising:

updating and sorting the each of the two or more lookup tables in response to the threshold value being updated.

9. The method of claim 4, wherein, for any pair of a first lookup table and a second lookup table in the two or more lookup tables, a first precision of the first lookup table storing candidate scale factors with higher magnitude is lower compared with a second precision of the second lookup table storing candidate scale factors with lower magnitude, each of the first precision and the second precision being measured by a step size between two adjacent scale factors in a respective lookup table.

10. The method of claim 4, wherein:

for any pair of a first lookup table and a second lookup table in the two or more lookup tables, a first precision of the first lookup table storing a candidate scale factor with a longer distance to a predefined threshold value is lower compared with a second precision of the second lookup table storing a candidate scale factor with shorter distances to the predefined threshold value;

a distance between a scale factor and the predefined threshold value is determined by an absolute value of a difference between the scale factor and the predefined threshold value; and each of the first precision and the second precision is measured by a step size between two adjacent scale factors in a lookup table.

11. The method of claim 1, wherein the current block is coded in one of following modes: a Block Adaptive Weighted Prediction (BAWP) mode; or a Local Illumination Compensation (LIC) mode.

12. The method of claim 1, further comprising:

deriving the offset as an average value of a template of the current block.

13. The method of claim 1, further comprising:

in response to a width of the current block being greater than a height of the current block, determining the offset based on above samples of a template of the current block; and in response to the height of the current block being greater than the width of the current block, determining the offset based on left samples of the template of the current block.

14. The method of claim 1, further comprising deriving the offset as an average value of one of:

an average value of the reference block; or an average value of a template of the reference block.

15. The method of claim 1, further comprising receiving a high level syntax indicating whether the signaling indicating or associating with the scale factor ($\alpha$) is used in the video bitstream, wherein the high level syntax is transmitted in at least one of following levels:

a sequence level;

a frame level;

a slice level; or a super block level.

16. The method of claim 15, further comprising in response to the high level syntax indicating that the signaling is used in the video bitstream:

determining that the scale factor is explicitly indicated by the signaling; and setting the offset to one of: 0; or average value of a template of the current block.

17. The method of claim 1, wherein the decoder maintains a lookup table for storing candidate value pairs formed by scale factor and offset, and the signaling carries an index identifying a target value pair in the lookup table, the target value pair comprising the scale factor and the offset to be used in the linear equation.

18. The method of claim 1, wherein:

the syntax element indicates the scale factor explicitly or implicitly; and p(x) is derived from on p'(x') based on the motion vector.

19. A device for processing video data, the device comprising a memory for storing computer instructions and a processor in communication with the memory, wherein, when the processor executes the computer instructions, the processor is configured to cause the device to:

receive a video bitstream comprising a current block in a current frame and a reference block in a reference frame, the reference block being used for predicting the current block and being identified by a motion vector associated with the current block;

receive, from the video bitstream, a syntax element indicating a scale factor ($\alpha$);

determine the scale factor ($\alpha$) based on a value of the syntax element, wherein the scale factor ($\alpha$) is used for predicting the current block;

predict the current block using an equation as following:

$$p'(x') = \alpha * p(x) + \beta$$

wherein: p'(x') is a predicted sample in the current block, p(x) is a collocated reference sample in the reference block corresponding to p'(x'), a correspondence between p'(x') and p(x) is established by the motion vector, $\alpha$ is the determined scale factor based on the value of the syntax element, and $\beta$ is an offset; and reconstruct the current block based on the predicted current block.

20. A non-transitory storage medium for storing computer readable instructions, the computer readable instructions, when executed by a processor, causing the processor to:

receive a video bitstream comprising a current block in a current frame and a reference block in a reference frame, the reference block being used for predicting the current block and being identified by a motion vector associated with the current block;

receive, from the video bitstream, a syntax element indicating a scale factor ($\alpha$);

determine the scale factor ($\alpha$) based on a value of the syntax element, wherein the scale factor ($\alpha$) is used for predicting the current block;

predict the current block using an equation as following:

$$p'(x') = \alpha * p(x) + \beta$$

wherein: p'(x') is a predicted sample in the current block, p(x) is a collocated reference sample in the reference block corresponding to p'(x'), a correspondence between p'(x') and p(x) is established by the motion vector, $\alpha$ is the determined scale factor based on the value of the syntax element, and $\beta$ is an offset; and reconstruct the current block based on the predicted current block.

* * * * *